US012739961B2

(12) United States Patent
Beyhaghi et al.

(10) Patent No.: US 12,739,961 B2
(45) Date of Patent: Sep. 15, 2026

(54) SOURCE MATERIAL DELIVERY SYSTEM, EUV RADIATION SYSTEM, LITHOGRAPHIC APPARATUS, AND METHODS THEREOF

(71) Applicant: ASML Netherlands B.V., Veldhoven (NL)

(72) Inventors: Pooriya Beyhaghi, San Diego, CA (US); Charles Edward Kinney, Encinitas, CA (US); Bob Rollinger, San Diego, CA (US); Joshua Mark Lukens, San Diego, CA (US)

(73) Assignee: ASML Netherlands B.V., Veldhoven (NL)

( * ) Notice: Subject to any disclaimer, the term of this patent is extended or adjusted under 35 U.S.C. 154(b) by 507 days.

(21) Appl. No.: 17/782,696

(22) PCT Filed: Dec. 2, 2020

(86) PCT No.: PCT/EP2020/084185
§ 371 (c)(1),
(2) Date: Jun. 6, 2022

(87) PCT Pub. No.: WO2021/121985
PCT Pub. Date: Jun. 24, 2021

(65) Prior Publication Data

US 2023/0010985 A1 Jan. 12, 2023

Related U.S. Application Data

(60) Provisional application No. 63/049,006, filed on Jul. 7, 2020, provisional application No. 62/951,913, filed on Dec. 20, 2019.

(51) Int. Cl.
*H05G 2/00* (2006.01)

(52) U.S. Cl.
CPC ................................ *H05G 2/0027* (2024.08)

(58) Field of Classification Search
None
See application file for complete search history.

(56) References Cited

U.S. PATENT DOCUMENTS 7,372,056 B2 5/2008 Bykanov et al.
7,405,416 B2 7/2008 Algots et al.
(Continued)

FOREIGN PATENT DOCUMENTS

CN 108496115 A 9/2018
JP 6151941 B2 6/2017
(Continued)

OTHER PUBLICATIONS

Sebastian Oestreich, European International Searching Authority, International Search Report and Written Opinion, counterpart PCT Application No. PCT/EP2020/084185, mailed May 3, 2021, 16 pages total.

*Primary Examiner* — Eliza W Osenbaugh-Stewart
(74) *Attorney, Agent, or Firm* — DiBerardino McGovern IP Group LLC

(57) ABSTRACT

A method includes ejecting initial droplets of a material using a nozzle. The method includes applying a pressure on the nozzle using an electromechanical element. The method includes controlling the applied pressure on the nozzle using an electrical signal generated by a waveform generator. The electrical signal includes a first periodic waveform and a second periodic waveform. The method includes coalescing the initial droplets to generate coalesced droplets based on the first and second periodic waveforms and drag. The method includes generating a detection signal, using a detector, corresponding to time intervals between crossings of coalesced droplets at the detector. The method includes determining at least first and second ones of the time intervals using a processor.

18 Claims, 13 Drawing Sheets

(56) References Cited

U.S. PATENT DOCUMENTS

| | | | |
|---|---|---|---|
| 7,872,245 B2 | 1/2011 | Vaschenko et al. | |
| 8,513,629 B2 | 8/2013 | Rajyaguru et al. | |
| 10,225,917 B2 | 3/2019 | Fujimaki et al. | |
| 10,359,710 B2 | 7/2019 | Schimmel et al. | |
| 10,481,498 B2 | 11/2019 | Dijksman et al. | |
| 2009/0014668 A1 | 1/2009 | Vaschenko | |
| 2012/0286176 A1 | 11/2012 | Rajyaguru et al. | |
| 2014/0246607 A1 | 9/2014 | Bykanov et al. | |
| 2014/0284502 A1* | 9/2014 | Nakano | H01L 21/268<br>250/504 R |
| 2015/0293456 A1 | 10/2015 | Dijksman et al. | |
| 2016/0044773 A1 | 2/2016 | Nakano et al. | |
| 2019/0150263 A1 | 5/2019 | Lai et al. | |

FOREIGN PATENT DOCUMENTS

| | | |
|---|---|---|
| WO | 2013077901 A1 | 5/2013 |
| WO | 2017102261 A1 | 6/2017 |
| WO | 2019137846 A1 | 7/2019 |
| WO | 2019185370 A1 | 10/2019 |
| WO | 2020148155 A1 | 7/2020 |

* cited by examiner

SOURCE MATERIAL DELIVERY SYSTEM, EUV RADIATION SYSTEM, LITHOGRAPHIC APPARATUS, AND METHODS THEREOF

CROSS REFERENCE TO RELATED APPLICATIONS

This application claims priority to U.S. Application No. 62/951,913, filed Dec. 20, 2019 and titled SOURCE MATERIAL DELIVERY SYSTEM, EUV RADIATION SYSTEM, LITHOGRAPHIC APPARATUS, AND METHODS THEREOF, and U.S. Application No. 63/049,006, filed Jul. 7, 2020 and titled SOURCE MATERIAL DELIVERY SYSTEM, EUV RADIATION SYSTEM, LITHOGRAPHIC APPARATUS, AND METHODS THEREOF, both of which are incorporated herein in their entireties by reference.

FIELD

The present application relates to extreme ultraviolet ("EUV") radiation sources and methods thereof. In one exemplary application, EUV radiation may be used as exposure radiation in a lithographic process to fabricate semiconductor devices.

BACKGROUND

A lithographic apparatus is a machine that applies a desired pattern onto a substrate, usually onto a target portion of the substrate. A lithographic apparatus can be used, for example, in the manufacture of integrated circuits (ICs). In that instance, a patterning device, which is alternatively referred to as a mask or a reticle, can be used to generate a circuit pattern to be formed on an individual layer of the IC. This pattern can be transferred onto a target portion (e.g., comprising part of, one, or several dies) on a substrate (e.g., a silicon wafer). Transfer of the pattern is typically via imaging onto a layer of radiation-sensitive material (resist) provided on the substrate. In general, a single substrate will contain a network of adjacent target portions that are successively patterned. Known lithographic apparatus include so-called steppers, in which each target portion is irradiated by exposing an entire pattern onto the target portion at one time, and so-called scanners, in which each target portion is irradiated by scanning the pattern through a radiation beam in a given direction (the "scanning"-direction) while synchronously scanning the target portions parallel or anti-parallel to this scanning direction. It is also possible to transfer the pattern from the patterning device to the substrate by imprinting the pattern onto the substrate.

Another lithographic system is an interferometric lithographic system where there is no patterning device, but rather a light beam is split into two beams, and the two beams are caused to interfere at a target portion of the substrate through the use of a reflection system. The interference causes lines to be formed at the target portion of the substrate.

A lithographic apparatus typically includes an illumination system that conditions radiation generated by a radiation source before the radiation is incident upon a patterning device. A patterned beam of EUV light can be used to produce extremely small features on a substrate. Extreme ultraviolet light (also sometimes referred to as soft x-rays) is generally defined as electromagnetic radiation having wavelengths in the range of about 5-100 nm. One particular wavelength of interest for photolithography occurs at 13.5 nm.

Methods to produce EUV light include, but are not necessarily limited to, converting a source material into a plasma state that has a chemical element with an emission line in the EUV range. These elements can include, but are not necessarily limited to, xenon, lithium and tin.

In one such method, often termed laser produced plasma ("LPP"), the desired plasma can be produced by irradiating a source material, for example, in the form of a droplet, stream or wire, with a laser beam. In another method, often termed discharge produced plasma ("DPP"), the required plasma can be generated by positioning source material having an appropriate emission line between a pair of electrodes and causing an electrical discharge to occur between the electrodes.

One technique for generating droplets involves melting a target material such as tin and then forcing it under high pressure through a relatively small diameter orifice, such as an orifice having a diameter of about 0.5 μm to about 30 pm, to produce a stream of droplets having droplet velocities in the range of about 30 m/s to about 150 m/s. Under most conditions, in a process called Rayleigh breakup, naturally occurring instabilities, e.g. noise, in the stream exiting the orifice, will cause the stream to break up into droplets. These droplets may have varying velocities and may combine with each other to coalesce into larger droplets.

However, limited control over droplet formation in EUV systems can cause unstable EUV generation, which in turn can impact accuracy of lithographic processes that depend on the EUV radiation.

SUMMARY

Accordingly, it is desirable to improve control the breakup/coalescence process to reduce instabilities in EUV generation to improve accuracy in EUV lithographic apparatuses.

In some embodiments, a system comprises a nozzle, an electromechanical element, and a waveform generator. The nozzle is configured to eject initial droplets of a material through a gas. The electromechanical element is disposed on the nozzle and is configured to apply a pressure on the nozzle. The waveform generator is electrically coupled to the electromechanical element and is configured to generate an electrical signal to control the applied pressure on the first nozzle. The electrical signal comprises a first periodic having a first frequency waveform and a second periodic waveform having a second frequency different from the first frequency. The ratio of the second frequency to the first frequency is between approximately 20-150. The system is configured to generate coalesced droplets from a coalescing of the initial droplets based on the first and second periodic waveforms and drag.

In some embodiments, a lithographic apparatus comprises an illumination system and a projection system. The illumination system comprises a nozzle, an electromechanical element, and a waveform generator. The illumination system is configured to illuminate a pattern of a patterning device. The nozzle is configured to eject initial droplets of a material through a gas. The electromechanical element is disposed on the nozzle and is configured to apply a pressure on the nozzle. The waveform generator is electrically coupled to the electromechanical element and is configured to generate an electrical signal to control the applied pressure on the nozzle. The electrical signal comprises a first periodic waveform having a first frequency and a second periodic waveform having a second frequency different from the first frequency. The ratio of the second frequency to the first frequency is between approximately 20-150. The illumination system is configured to generate coalesced droplets from a coalescing of the initial droplets based on the first and second periodic waveforms and drag.

In some embodiments, a method comprises ejecting initial droplets of a material using a nozzle, applying a pressure on the nozzle using an electromechanical element, dispensing gas in the path of the material, controlling the applied pressure on the nozzle using an electrical signal generated by a waveform generator, and coalescing of the initial droplets to generate coalesced droplets. The electrical signal comprises a first periodic waveform having a first frequency and a second periodic waveform having a second frequency different from the first frequency and a ratio of the second frequency to the first frequency is between approximately 20-150. The coalescing is based on the first and second periodic waveforms and drag.

In some embodiments, a method comprises ejecting initial droplets of a material using a nozzle. The method may also comprise applying a pressure on the nozzle using an electromechanical element. The method may also comprise controlling the applied pressure on the nozzle using an electrical signal generated by a waveform generator, wherein the electrical signal comprises a first periodic waveform and a second periodic waveform. The method may also comprise coalescing the initial droplets to generate coalesced droplets based on the first and second periodic waveforms and drag. The method may also comprise generating a detection signal, using a detector, corresponding to time intervals between crossings of coalesced droplets at the detector. The method may also comprise determining at least first and second ones of the time intervals using a processor.

In some embodiments, a non-transitory computer readable medium having instructions stored thereon, that, when executed on a processor, cause the processor to perform operations, the operations comprising receiving a detection signal from a detector of a source material delivery system, wherein the detection signal is associated with time intervals between crossings of coalesced droplets at the detector. The operations may also comprise determining at least first and second ones of the time intervals based on the detection signal.

In some embodiments, a system comprises a nozzle, an electromechanical element, a waveform generator, a detector, and a processor. The nozzle is configured to eject initial droplets of a material. The electromechanical element is disposed on the nozzle and is configured to apply a pressure on the nozzle. The waveform generator is electrically coupled to the electromechanical element and is configured to generate an electrical signal to control the applied pressure on the nozzle. The electrical signal comprises a first periodic waveform and a second periodic waveform. The system is configured to generate coalesced droplets from a coalescing of the initial droplets based on the first and second periodic waveforms. The detector is configured to generate a detection signal comprising information of time intervals between crossings of the coalesced droplets at the detector. The processor is configured to determine at least first and second ones of the time intervals.

Further features of various embodiments of the present disclosure are described in detail below with reference to the accompanying drawings. It is noted that the present disclosure is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present disclosure and, together with the description, further serve to explain the principles of the present disclosure and to enable a person skilled in the relevant art(s) to make and use embodiments described herein.

FIG. 1 shows a schematic of a reflective lithographic apparatus, according to some embodiments.

FIGS. 2A, 2B, and 3 show more detailed schematics of a reflective lithographic apparatus, according to some embodiments.

Figure 1:
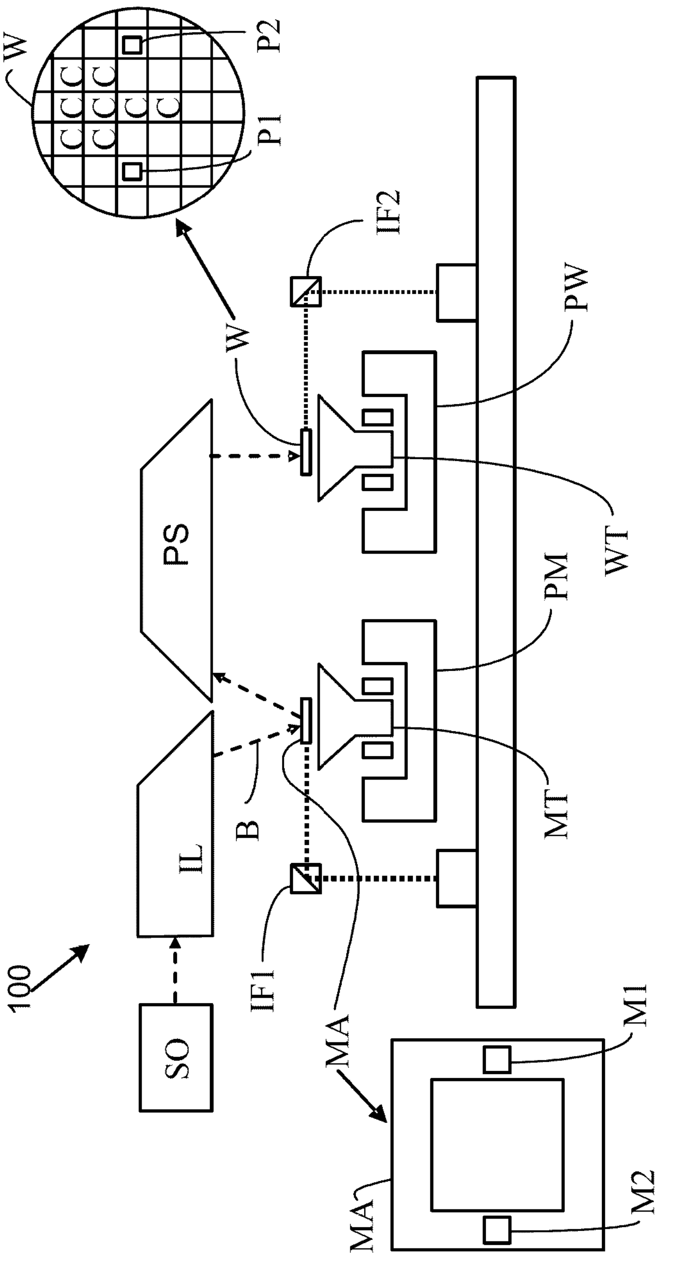

The features of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements. Additionally, generally, the left-most digit(s) of a reference number identifies the drawing in which the reference number first appears. Unless otherwise indicated, the drawings provided throughout the disclosure should not be interpreted as to-scale drawings.

DETAILED DESCRIPTION

This specification discloses one or more embodiments that incorporate the features of the present disclosure. The disclosed embodiment(s) are provided as examples. The scope of the present disclosure is not limited to the disclosed embodiment(s). Claimed features are defined by the claims appended hereto.

The embodiment(s) described, and references in the specification to "one embodiment," "an embodiment," "an exemplary embodiment," "an example embodiment," etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Spatially relative terms, such as “beneath,” “below,” “lower,” “above,” “on,” “upper” and the like, can be used herein for ease of description to describe one element or feature’s relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein may likewise be interpreted accordingly.

The term “about” as used herein indicates the value of a given quantity that can vary based on a particular technology. Based on the particular technology, the term “about” can indicate a value of a given quantity that varies within, for example, 10-30% of the value (e.g., ±10%, ±20%, or ±30% of the value).

Embodiments of the disclosure can be implemented in hardware, firmware, software, or any combination thereof. Embodiments of the disclosure may also be implemented as instructions stored on a machine-readable medium, which can be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, and/or instructions can be described herein as performing certain actions. However, it should be appreciated that such descriptions are merely for convenience and that such actions in fact result from computing devices, processors, controllers, or other devices executing the firmware, software, routines, instructions, etc.

Before describing such embodiments in more detail, however, it is instructive to present an example environment in which embodiments of the present disclosure can be implemented.

Example Lithographic Systems

FIG. 1 shows a schematic illustration of a lithographic apparatus 100 in which embodiments of the present disclosure may be implemented. Lithographic apparatus 100 includes the following: an illumination system (illuminator) IL configured to condition a radiation beam B (for example, deep ultra violet or extreme ultra violet radiation); a support structure (for example, a mask table) MT configured to support a patterning device (for example, a mask, a reticle, or a dynamic patterning device) MA and connected to a first positioner PM configured to accurately position the patterning device MA; and, a substrate table (for example, a wafer table) WT configured to hold a substrate (for example, a resist coated wafer) W and connected to a second positioner PW configured to accurately position the substrate W. Lithographic apparatus 100 also has a projection system PS configured to project a pattern imparted to the radiation beam B by patterning device MA onto a target portion (for example, comprising one or more dies) C of the substrate W. In lithographic apparatus 100, the patterning device MA and the projection system PS are reflective.

The illumination system IL may include various types of optical components, such as refractive, reflective, catadioptric, magnetic, electromagnetic, electrostatic, or other types of optical components, or any combination thereof, for directing, shaping, or controlling the radiation beam B. The illumination system IL can also include a sensor ES that provides a measurement of, for example, one or more of energy per pulse, photon energy, intensity, average power, and the like. The illumination system IL may include a measurement sensor MS for measuring a movement of the radiation beam B and uniformity compensators UC that allow an illumination slit uniformity to be controlled. The measurement sensor MS may also be disposed at other locations. For example, the measurement sensor MS may be on or near the substrate table WT.

The support structure MT holds the patterning device MA in a manner that depends on the orientation of the patterning device MA with respect to a reference frame, the design of lithographic apparatus 100, and other conditions, such as whether or not the patterning device MA is held in a vacuum environment. The support structure MT may use mechanical, vacuum, electrostatic, or other clamping techniques to hold the patterning device MA. The support structure MT may be a frame or a table, for example, which may be fixed or movable, as required. By using sensors, the support structure MT may ensure that the patterning device MA is at a desired position, for example, with respect to the projection system PS.

The term “patterning device” MA should be broadly interpreted as referring to any device that may be used to impart a radiation beam B with a pattern in its cross-section, such as to create a pattern in the target portion C of the substrate W. The pattern imparted to the radiation beam B may correspond to a particular functional layer in a device being created in the target portion C to form an integrated circuit.

The patterning device MA may be reflective. Examples of patterning devices MA include reticles, masks, programmable mirror arrays, or programmable LCD panels. Masks are well known in lithography, and include mask types such as binary, alternating phase shift, or attenuated phase shift, as well as various hybrid mask types. An example of a programmable mirror array employs a matrix arrangement of small mirrors, each of which may be individually tilted so as to reflect an incoming radiation beam in different directions. The tilted mirrors impart a pattern in the radiation beam B, which is reflected by a matrix of small mirrors.

The term “projection system” PS may encompass any type of projection system, including refractive, reflective, catadioptric, magnetic, electromagnetic and electrostatic optical systems, or any combination thereof, as appropriate for the exposure radiation being used, or for other factors, such as the use of an immersion liquid on the substrate W or the use of a vacuum. A vacuum environment may be used for EUV or electron beam radiation since other gases may absorb too much radiation or electrons. A vacuum environment may therefore be provided to the whole beam path with the aid of a vacuum wall and vacuum pumps.

Lithographic apparatus 100 may be of a type having two (dual stage) or more substrate tables WT (and/or two or more mask tables). In such “multiple stage” machines, the additional substrate tables WT may be used in parallel, or preparatory steps may be carried out on one or more tables while one or more other substrate tables WT are being used for exposure. In some situations, the additional table may not be a substrate table WT.

The lithographic apparatus may also be of a type wherein at least a portion of the substrate may be covered by a liquid having a relatively high refractive index, e.g., water, so as to fill a space between the projection system and the substrate. An immersion liquid may also be applied to other spaces in the lithographic apparatus, for example, between the mask and the projection system. Immersion techniques are well known in the art for increasing the numerical aperture of projection systems. The term "immersion" as used herein does not mean that a structure, such as a substrate, must be submerged in liquid, but rather only means that liquid is located between the projection system and the substrate during exposure.

The illuminator IL receives a radiation beam from a radiation source SO. The source SO and the lithographic apparatus 100 may be separate physical entities, for example, when the source SO is an excimer laser. In such cases, the source SO is not considered to form part of the lithographic apparatus 100 and the radiation beam B passes from the source SO to the illuminator IL with the aid of a beam delivery system BD (not shown) including, for example, suitable directing mirrors and/or a beam expander. In other cases, the source SO may be an integral part of the lithographic apparatus 100, for example, when the source SO is a mercury lamp. The source SO and the illuminator IL, together with the beam delivery system BD, if required, may be referred to as a radiation system.

To not overcomplicate the drawing, the illuminator IL may include other components that are not shown. For example, the illuminator IL may include an adjuster for adjusting the angular intensity distribution of the radiation beam. Generally, at least the outer and/or inner radial extent (commonly referred to as "σ-outer" and "σ-inner," respectively) of the intensity distribution in a pupil plane of the illuminator may be adjusted. The illuminator IL may comprise an integrator and/or a condenser (not shown). The illuminator IL may be used to condition the radiation beam B to have a desired uniformity and intensity distribution in its cross section. The desired uniformity of radiation beam B can be maintained by using a uniformity compensator. Uniformity compensator comprises a plurality of protrusions (e.g., fingers) that may be adjusted in the path of radiation beam B to control the uniformity of radiation beam B. A sensor may be used to monitor the uniformity of radiation beam B.

The radiation beam B is incident on the patterning device (for example, mask) MA, which is held on the support structure (for example, mask table) MT, and is patterned by the patterning device MA. In lithographic apparatus 100, the radiation beam B is reflected from the patterning device (for example, mask) MA. After being reflected from the patterning device (for example, mask) MA, the radiation beam B passes through the projection system PS, which focuses the radiation beam B onto a target portion C of the substrate W. With the aid of the second positioner PW and position sensor IF2 (for example, an interferometric device, linear encoder, or capacitive sensor), the substrate table WT may be moved accurately (for example, so as to position different target portions C in the path of the radiation beam B). Similarly, the first positioner PM and another position sensor IF1 may be used to accurately position the patterning device (for example, mask) MA with respect to the path of the radiation beam B. Patterning device (for example, mask) MA and substrate W may be aligned using mask alignment marks M1, M2 and substrate alignment marks P1, P2.

The lithographic apparatus 100 may be used in at least one of the following modes:

1. In step mode, the support structure (for example, mask table) MT and the substrate table WT are kept essentially stationary, while an entire pattern imparted to the radiation beam B is projected onto a target portion C at one time (i.e., a single static exposure). The substrate table WT is then shifted in the X and/or Y direction so that a different target portion C may be exposed.

2. In scan mode, the support structure (for example, mask table) MT and the substrate table WT are scanned synchronously while a pattern imparted to the radiation beam B is projected onto a target portion C (i.e., a single dynamic exposure). The velocity and direction of the substrate table WT relative to the support structure (for example, mask table) MT may be determined by the (de-)magnification and image reversal characteristics of the projection system PS.

3. In another mode, the support structure (for example, mask table) MT is kept substantially stationary holding a programmable patterning device, and the substrate table WT is moved or scanned while a pattern imparted to the radiation beam B is projected onto a target portion C. A pulsed radiation source SO may be employed and the programmable patterning device is updated as required after each movement of the substrate table WT or in between successive radiation pulses during a scan. This mode of operation may be readily applied to maskless lithography that utilizes a programmable patterning device, such as a programmable mirror array.

Combinations and/or variations on the described modes of use or entirely different modes of use may also be employed.

In a further embodiment, lithographic apparatus 100 includes EUV radiation source configured to generate a beam of EUV radiation for EUV lithography. In general, the EUV radiation source is configured in a radiation system, and a corresponding illumination system is configured to condition the EUV radiation beam of the EUV source.

Figure 2A:
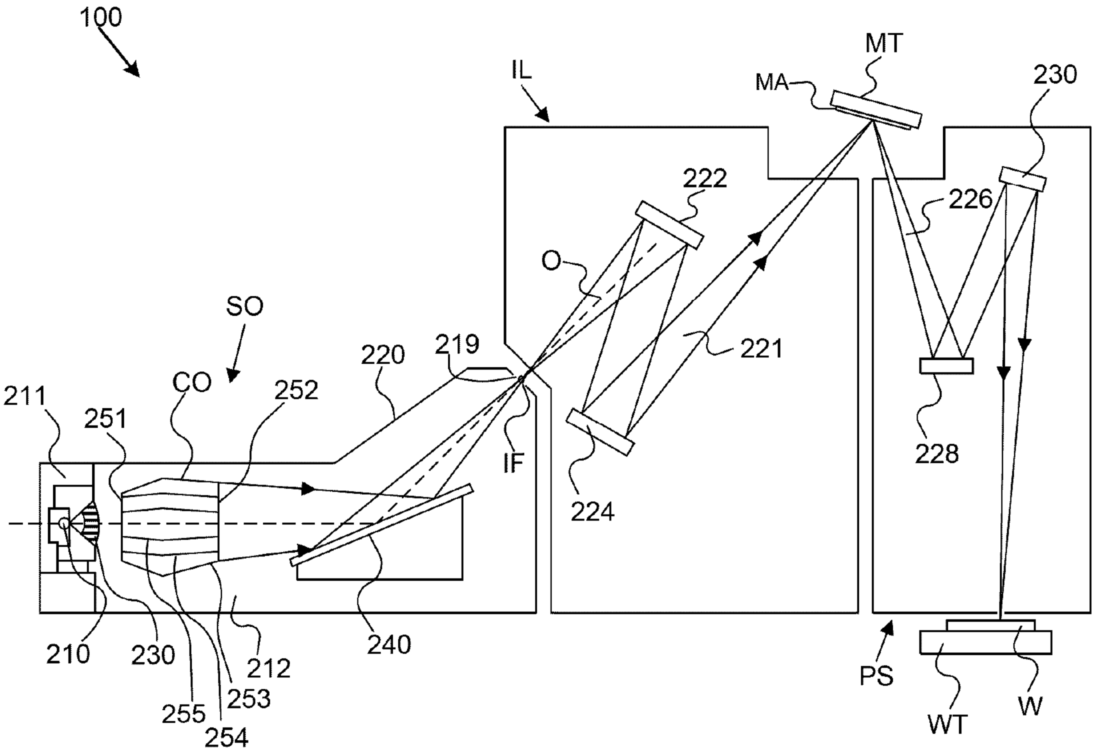

FIG. 2A shows the lithographic apparatus 100 (e.g., FIG. 1) in more detail, including the source collector apparatus SO, the illumination system IL, and the projection system PS, according to some embodiments. The source collector apparatus SO is constructed and arranged such that a vacuum environment may be maintained in an enclosing structure 220 of the source collector apparatus SO. An EUV radiation emitting plasma 210 may be formed by a discharge produced plasma source. EUV radiation may be produced by a gas or vapor, for example Xe gas, Li vapor, or Sn vapor in which the very hot plasma 210 is created to emit radiation in the EUV range of the electromagnetic spectrum. The very hot plasma 210 is created by, for example, an electrical discharge causing at least a partially ionized plasma. Partial pressures of, for example, 10 Pa of Xe, Li, Sn vapor, or any other suitable gas or vapor may be required for efficient generation of the radiation. In some embodiments, a plasma of excited tin (Sn) (e.g., excited via a laser) is provided to produce EUV radiation.

The radiation emitted by the hot plasma 210 is passed from a source chamber 211 into a collector chamber 212 via an optional gas barrier or contaminant trap 230 (in some cases also referred to as contaminant barrier or foil trap), which is positioned in or behind an opening in source chamber 211. The contaminant trap 230 can include a channel structure. Contamination trap 230 can also include a gas barrier or a combination of a gas barrier and a channel structure. The contaminant trap or contaminant barrier 230 further indicated herein at least includes a channel structure.

The collector chamber 212 can include a radiation collector CO, which may be a so-called grazing incidence collector. Radiation collector CO has an upstream radiation collector side 251 and a downstream radiation collector side 252. Radiation that traverses collector CO may be reflected off a grating spectral filter 240 to be focused in a virtual source point IF. The virtual source point IF is commonly referred to as the intermediate focus, and the source collector apparatus is arranged such that the intermediate focus IF is located at or near an opening 219 in the enclosing structure 220. The virtual source point IF is an image of the radiation emitting plasma 210. Grating spectral filter 240 is used in particular for suppressing infra-red (IR) radiation.

Subsequently the radiation traverses the illumination system IL, which can include a faceted field mirror device 222 and a faceted pupil mirror device 224 arranged to provide a desired angular distribution of the radiation beam 221, at the patterning device MA, as well as a desired uniformity of radiation intensity at the patterning device MA. Upon reflection of the beam of radiation 221 at the patterning device MA, held by the support structure MT, a patterned beam 226 is formed and the patterned beam 226 is imaged by the projection system PS via reflective elements 228, 229 onto a substrate W held by the wafer stage or substrate table WT.

More elements than shown can generally be present in illumination optics unit IL and projection system PS. The grating spectral filter 240 can optionally be present, depending upon the type of lithographic apparatus. Further, there may be more mirrors present than those shown in the FIG. 2A, for example there may be one to six additional reflective elements present in the projection system PS than shown in FIG. 2A.

In some embodiments, illumination optics unit IL may include a sensor ES that provides a measurement of, for example, one or more of energy per pulse, photon energy, intensity, average power, and the like. Illumination optics unit IL may include a measurement sensor MS for measuring a movement of the radiation beam B and uniformity compensators UC that allow an illumination slit uniformity to be controlled. The measurement sensor MS may also be disposed at other locations. For example, the measurement sensor MS may be on or near the substrate table WT.

Collector optic CO, as illustrated in FIG. 2A, is depicted as a nested collector with grazing incidence reflectors 253, 254, and 255, just as an example of a collector (or collector mirror). The grazing incidence reflectors 253, 254, and 255 are disposed axially symmetric around an optical axis O and a collector optic CO of this type is preferably used in combination with a discharge produced plasma source, often called a DPP source.

Figure 2B:
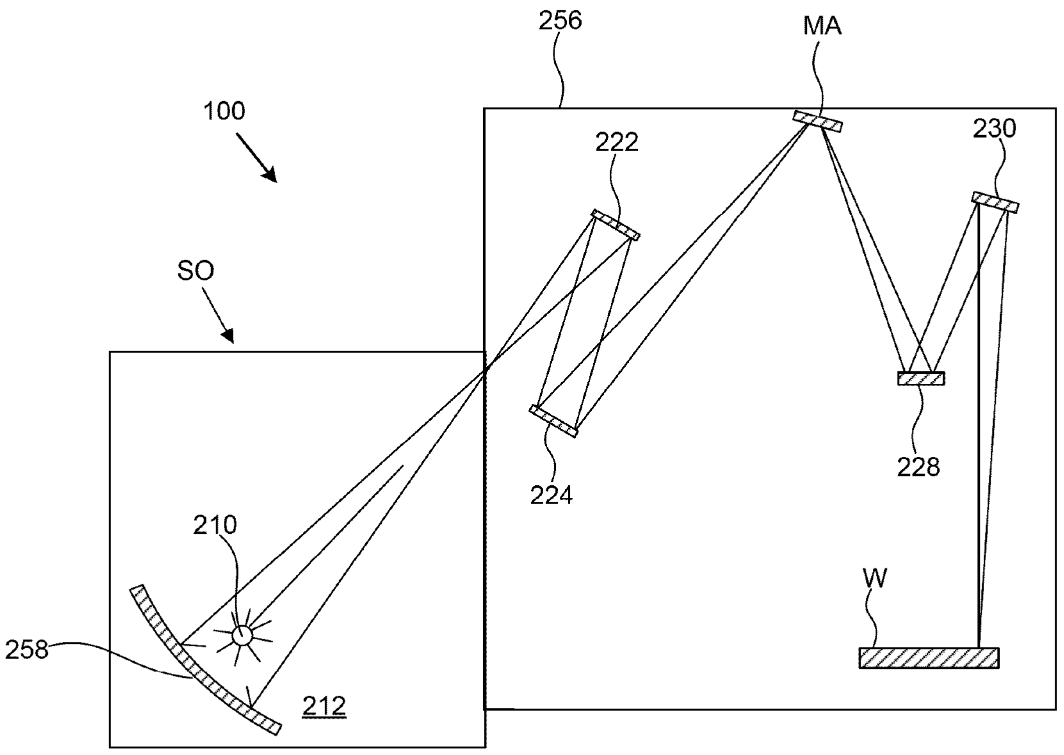

FIG. 2B shows a schematic view of selected portions of lithographic apparatus 100 (e.g., FIG. 1), but with alternative collection optics in the source collector apparatus SO, according to some embodiments. It should be appreciated that structures shown in FIG. 2A that do not appear in FIG. 2B (for drawing clarity) may still be included in embodiments referring to FIG. 2B. Elements in FIG. 2B having the same reference numbers as those in FIG. 2A have the same or substantially similar structures and functions as described in reference to FIG. 2A. In some embodiments, the lithographic apparatus 100 may be used, for example, to expose a substrate W such as a resist coated wafer with a patterned beam of EUV light. In FIG. 2B, the illumination system IL and the projection system PS are represented combined as an exposure device 256 (e.g., an integrated circuit lithography tool such as a stepper, scanner, step and scan system, direct write system, device using a contact and/or proximity mask, etc.) that uses EUV light from the source collector apparatus SO. The lithographic apparatus 100 may also include collector optic 258 that reflects EUV light from the hot plasma 210 along a path into the exposure device 256 to irradiate the substrate W. Collector optic 258 may comprise a near-normal incidence collector mirror having a reflective surface in the form of a prolate spheroid (i.e., an ellipse rotated about its major axis) having, e.g., a graded multi-layer coating with alternating layers of Molybdenum and Silicon, and in some cases, one or more high temperature diffusion barrier layers, smoothing layers, capping layers and/or etch stop layers.

Figure 3:
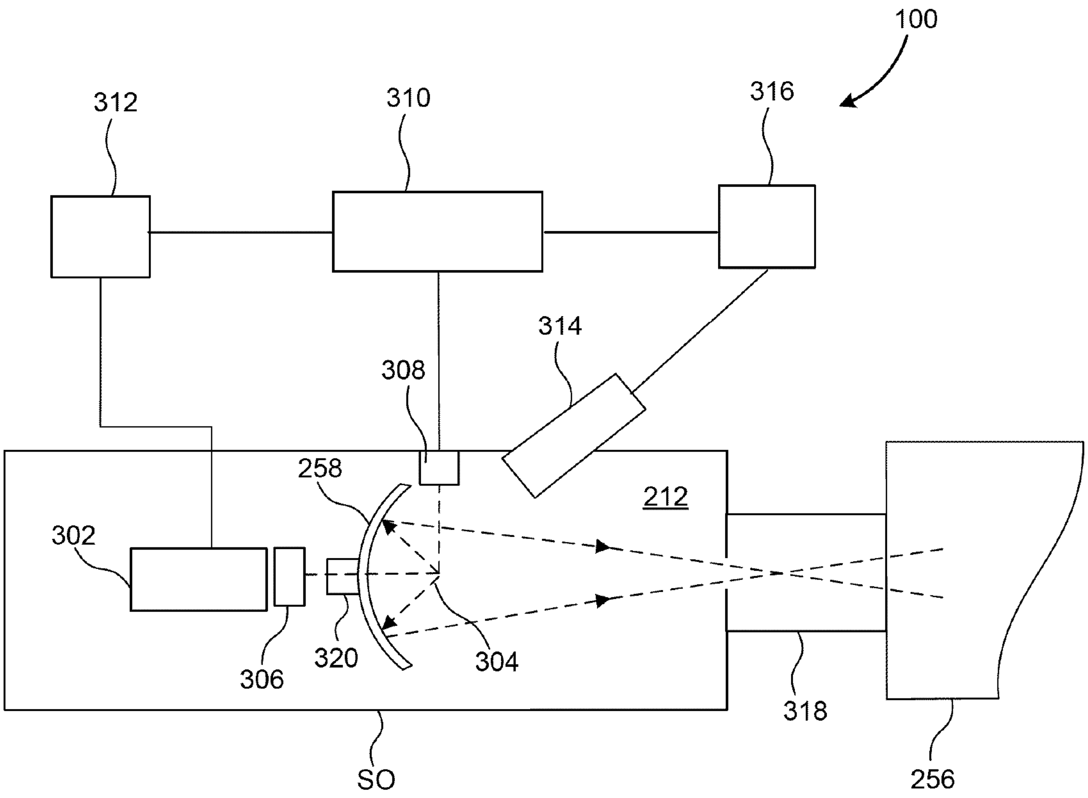

FIG. 3 shows a detailed view of a portion of lithographic apparatus 100 (e.g., FIGS. 1, 2A, and 2B), according to one or more embodiments. Elements in FIG. 3 having the same reference numbers as those in FIGS. 1, 2A, and 2B have the same or substantially similar structures and functions as described in reference to FIGS. 1, 2A, and 2B. In some embodiments, lithographic apparatus 100 may include a source collector apparatus SO having an LPP EUV light radiator. As shown, the source collector apparatus SO may include a laser system 302 for generating a train of light pulses and delivering the light pulses into a light source chamber 212. For the lithographic apparatus 100, the light pulses may travel along one or more beam paths from the laser system 302 and into the chamber 212 to illuminate a source material at an irradiation region 304 to generate a plasma (e.g., plasma region where hot plasma 210 is in FIG. 2B) that produces EUV light for substrate exposure in the exposure device 256.

In some embodiments, suitable lasers for use in the laser system 302 may include a pulsed laser device, e.g., a pulsed gas discharge $CO_2$ laser device producing radiation at 9.3 pm or 10.6 pm, e.g., with DC or RF excitation, operating at relatively high power, e.g., 10 kW or higher and high pulse repetition rate, e.g., 50 kHz or more. In some embodiments, the laser may be an axial-flow RF-pumped $CO_2$ laser having an oscillator amplifier configuration (e.g., master oscillator/power amplifier (MOPA) or power oscillator/power amplifier (POPA)) with multiple stages of amplification and having a seed pulse that is initiated by a Q-switched oscillator with relatively low energy and high repetition rate, e.g., capable of 100 kHz operation. From the oscillator, the laser pulse may then be amplified, shaped and/or focused before reaching the irradiation region 304. Continuously pumped $CO_2$ amplifiers may be used for the laser system 302. Alternatively, the laser may be configured as a so-called "self-targeting" laser system in which the droplet serves as one mirror of the optical cavity of the laser.

In some embodiments, depending on the application, other types of lasers may also be suitable, e.g., an excimer or molecular fluorine laser operating at high power and high pulse repetition rate. Some examples include, a solid state laser, e.g., having a fiber, rod, slab, or disk-shaped active media, other laser architectures having one or more chambers, e.g., an oscillator chamber and one or more amplifying chambers (with the amplifying chambers in parallel or in series), a master oscillator/power oscillator (MOPO) arrangement, a master oscillator/power ring amplifier (MOPRA) arrangement, or a solid state laser that seeds one or more excimer, molecular fluorine or $CO_2$ amplifier or oscillator chambers, may be suitable. Other suitable designs may be envisioned.

In some embodiments, a source material may first be irradiated by a pre-pulse and thereafter irradiated by a main pulse. Pre-pulse and main pulse seeds may be generated by a single oscillator or two separate oscillators. One or more common amplifiers may be used to amplify both the pre-pulse seed and main pulse seed. In some embodiments, separate amplifiers may be used to amplify the pre-pulse and main pulse seeds.

In some embodiments, the lithographic apparatus 100 may include a beam conditioning unit 306 having one or more optics for beam conditioning such as expanding, steering, and/or focusing the beam between the laser system 302 and irradiation region 304. For example, a steering system, which may include one or more mirrors, prisms, lenses, etc., may be provided and arranged to steer the laser focal spot to different locations in the chamber 212. For example, the steering system may include a first flat mirror mounted on a tip-tilt actuator which may move the first mirror independently in two dimensions, and a second flat mirror mounted on a tip-tilt actuator which may move the second mirror independently in two dimensions. With the described arrangement(s), the steering system may controllably move the focal spot in directions substantially orthogonal to the direction of beam propagation (beam axis or optical axis).

The beam conditioning unit 306 may include a focusing assembly to focus the beam to the irradiation region 304 and adjust the position of the focal spot along the beam axis. For the focusing assembly, an optic, such as a focusing lens or mirror, may be used that is coupled to an actuator for movement in a direction along the beam axis to move the focal spot along the beam axis.

In some embodiments, the source collector apparatus SO may also include a source material delivery system 308, e.g., delivering source material, such as tin droplets, into the interior of chamber 212 to an irradiation region 304, where the droplets will interact with light pulses from the laser system 302, to ultimately produce plasma and generate an EUV emission to expose a substrate such as a resist coated wafer in the exposure device 256. More details regarding various droplet dispenser configurations may be found in, e.g., U.S. Pat. No. 7,872,245, issued on Jan. 18, 2011, titled “Systems and Methods for Target Material Delivery in a Laser Produced Plasma EUV Light Source”, U.S. Pat. No. 7,405,416, issued on Jul. 29, 2008, titled “Method and Apparatus For EUV Plasma Source Target Delivery”, U.S. Pat. No. 7,372,056, issued on May 13, 2008, titled “LPP EUV Plasma Source Material Target Delivery System”, and International Appl. No. WO 2019/137846, titled “Apparatus for and Method of Controlling Coalescence of Droplets In a Droplet Stream”, published on Jul. 18, 2019, the contents of each of which are incorporated by reference herein in their entirety.

In some embodiments, the source material for producing an EUV light output for substrate exposure may include, but is not necessarily limited to, a material that includes tin, lithium, xenon or combinations thereof. The EUV emitting element, e.g., tin, lithium, xenon, etc., may be in the form of liquid droplets and/or solid particles contained within liquid droplets. For example, the element tin may be used as pure tin, as a tin compound, e.g., $SnBr_4$, $SnBr_2$, $SnH_4$, as a tin alloy, e.g., tin-gallium alloys, tin-indium alloys, tin-indium-gallium alloys, or a combination thereof. Depending on the material used, the source material may be presented to the irradiation region at various temperatures including room temperature or near room temperature (e.g., tin alloys, $SnBr_4$), at an elevated temperature, (e.g., pure tin) or at temperatures below room temperature, (e.g., $SnH_4$), and in some cases, can be relatively volatile, e.g., $SnBr_4$.

In some embodiments, the lithographic apparatus 100 may also include a controller 310, which may also include a drive laser control system 312 for controlling devices in the laser system 302 to thereby generate light pulses for delivery into the chamber 212, and/or for controlling movement of optics in the beam conditioning unit 306. The lithographic apparatus 100 may also include a droplet position detection system which may include one or more droplet imagers 314 that provide an output signal indicative of the position of one or more droplets, e.g., relative to the irradiation region 304. The droplet imager(s) 314 may provide this output to a droplet position detection feedback system 316, which can, e.g., compute a droplet position and trajectory, from which a droplet error can be computed, e.g., on a droplet-by-droplet basis, or on average. The droplet error may then be provided as an input to the controller 310, which can, for example, provide a position, direction and/or timing correction signal to the laser system 302 to control laser trigger timing and/or to control movement of optics in the beam conditioning unit 306, e.g., to change the location and/or focal power of the light pulses being delivered to the irradiation region 304 in the chamber 212. Also for the source collector apparatus SO, the source material delivery system 308 may have a control system operable in response to a signal (which in some implementations may include the droplet error described above, or some quantity derived therefrom) from the controller 310, to e.g., modify the release point, initial droplet stream direction, droplet release timing and/or droplet modulation to correct for errors in the droplets arriving at the irradiation region 304.

In some embodiments, the lithographic apparatus 100 may also include a collector optic a gas dispenser device 320. Gas dispenser device 320 may dispense gas in the path of the source material from the source material delivery system 308 (e.g., irradiation region 304). Gas dispenser device 320 may comprise a nozzle through which dispensed gas may exit. Gas dispenser device 320 may be structured (e.g., having an aperture) such that, when placed near the optical path of laser system 302, light from laser system 302 is not blocked by gas dispenser device 320 and is allowed to reach the irradiation region 304. A buffer gas such as hydrogen, helium, argon or combinations thereof, may be introduced into, replenished and/or removed from the chamber 212. The buffer gas may be present in the chamber 212 during plasma discharge and may act to slow plasma created ions, to reduce degradation of optics, and/or increase plasma efficiency. Alternatively, a magnetic field and/or electric field (not shown) may be used alone, or in combination with a buffer gas, to reduce fast ion damage.

In some embodiments, the lithographic apparatus 100 may also include a collector optic 258 such as a near-normal incidence collector mirror having a reflective surface in the form of a prolate spheroid (i.e., an ellipse rotated about its major axis) having, e.g., a graded multi-layer coating with alternating layers of Molybdenum and Silicon, and in some cases, one or more high temperature diffusion barrier layers, smoothing layers, capping layers and/or etch stop layers. Collector optic 258 may be formed with an aperture to allow the light pulses generated by the laser system 302 to pass through and reach the irradiation region 304. The same, or another similar aperture, may be used to allow gas from the gas dispenser device 320 to flow into chamber 212. As shown, the collector optic 258 may be, e.g., a prolate spheroid mirror that has a first focus within or near the irradiation region 304 and a second focus at a so-called intermediate region 318, where the EUV light may be output from the source collector apparatus SO and input to an exposure device 256 utilizing EUV light, e.g., an integrated circuit lithography tool. It is to be appreciated that other optics may be used in place of the prolate spheroid mirror for collecting and directing light to an intermediate location for subsequent delivery to a device utilizing EUV light. Embodiments using the collector optic CO (FIG. 2A) with structures and functions described in reference to FIG. 3 may also be envisioned.

Exemplary Lithographic Cell

Figure 4:
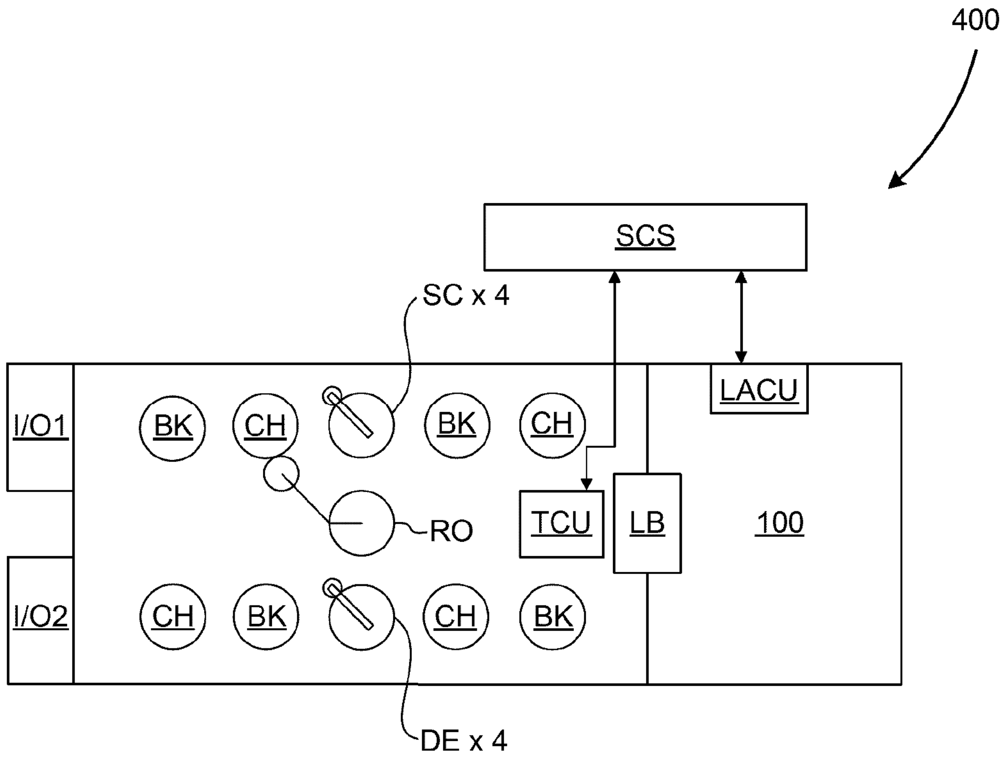
FIG. 4 shows a schematic of a lithographic cell, according to some embodiments.

FIG. 4 shows a lithographic cell 400, also sometimes referred to a lithocell or cluster, according to some embodiments. Lithographic apparatus 100 may form part of lithographic cell 400. Lithographic cell 400 may also include one or more apparatuses to perform pre- and post-exposure processes on a substrate. Conventionally these include spin coaters SC to deposit resist layers, developers DE to develop exposed resist, chill plates CH, and bake plates BK. A substrate handler, or robot, RO picks up substrates from input/output ports I/O1, I/O2, moves them between the different process apparatuses and delivers them to the loading bay LB of the lithographic apparatus 100. These devices, which are often collectively referred to as the track, are under the control of a track control unit TCU, which is itself controlled by a supervisory control system SCS, which also controls the lithographic apparatus via lithography control unit LACU. Thus, the different apparatuses may be operated to maximize throughput and processing efficiency.

Exemplary Plasma Material Droplet Source

Figure 5:
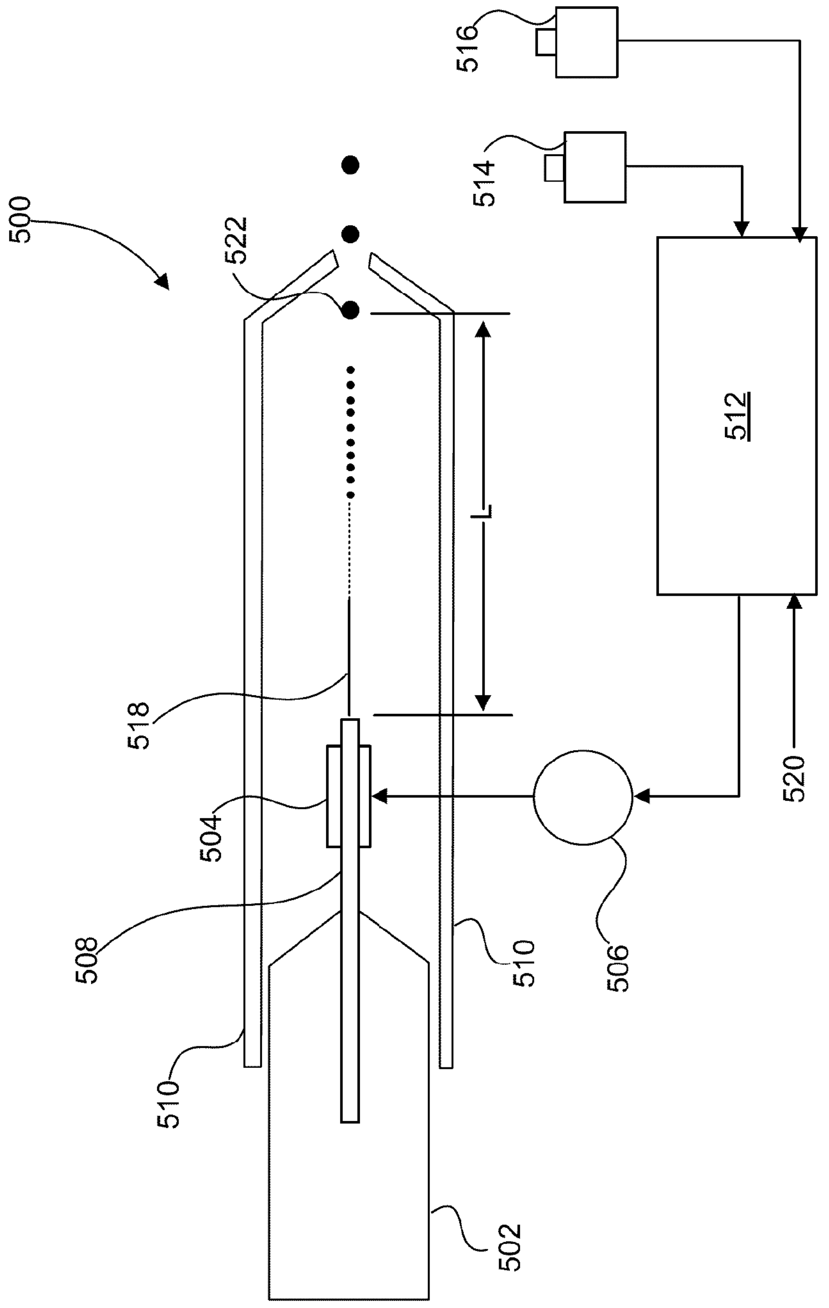
FIG. 5 shows a schematic of a source material delivery system, according to some embodiments.

FIG. 5 shows a schematic of a source material delivery system 500, according to some embodiments. In some embodiments, source material delivery system 500 may be used in a lithographic apparatus 100 (e.g., source material delivery system 90 in FIG. 3). Source material delivery system 500 may comprise a nozzle 502, an electromechanical element 504, and a waveform generator 506. Nozzle 502 may comprise a capillary 508. Source material delivery system 500 may further comprise a shroud 510, a controller 512, a detector 514, and/or a detector 516. Controller 512 may comprise a processor.

As used herein, the term "electromechanical," "electro-actuatable," and the like may refer to a material or structure which undergoes a dimensional change (e.g., movement, deflection, contraction, and the like) when subjected to a voltage, electric field, magnetic field, or combinations thereof and includes, but is not limited to, piezoelectric materials, electrostrictive materials, and magnetostrictive materials. Apparatuses and methods for using an electro-actuatable element to control a droplet stream are disclosed, for example, in U.S. Pub. Appl. No. 2009/0014668, titled "Laser Produced Plasma EUV Light Source Having a Droplet Stream Produced Using a Modulated Disturbance Wave" and published Jan. 15, 2009, and U.S. Pat. No. 8,513,629, titled "Droplet Generator with Actuator Induced Nozzle Cleaning" and issued Aug. 20, 2013, both of which are incorporated by reference herein in their entireties.

In some embodiments, electromechanical element 504 may be disposed on (e.g., surrounding) nozzle 502. It should be appreciated that interactions between nozzle 502 and electromechanical element 504 described herein may be directed to interactions between a pressure-sensitive element of nozzle 502 and electromechanical element 504 (e.g., electromechanical element 504 is disposed on capillary 508). Waveform generator 506 may be electrically coupled to electromechanical element 504. Controller 512 may be electrically coupled to waveform generator 506.

As explained earlier, in some embodiments, an EUV-generating-plasma may be generated by irradiating target material (e.g., Sn) with a laser, which ionizes the target material (i.e., excitation). The target material may be provided as a stream of coalesced droplets that intersects the laser path. Microscopic interactions between a coalesced target material droplet and the laser may affect efficiency and stability of EUV radiation, which in turn may impact lithographic processes that depend on the EUV radiation. Therefore, it is desirable to control the interaction between coalesced droplet and the laser such that EUV-generation is stable and efficient. One method to improve stability and efficiency is to ensure repeatable coalescence of target material droplets so that each coalesced droplet produces a repeatable interaction with the laser. Structures and functions in embodiments of the present disclosure allow for repeatable coalescence of target material droplets.

In some embodiments, nozzle 502 may eject initial droplets of target material, shown in FIG. 5 as a stream of target material 518. electromechanical element 504 may transduce electrical energy from the waveform generator 506 to apply a pressure on nozzle 502 (e.g., on capillary 508). This introduces a velocity perturbation in stream of target material 518 exiting nozzle 502. Stream of target material 518 ultimately coalesces into droplets which are detected by detector 514 and/or detector 516 to generate a signal (e.g., a detection signal). As used herein, the term "detect" and the like may be used to refer to capturing an image (e.g., using a camera) of the droplet and/or binary indication of the presence or absence of a droplet or when a droplet crosses a given location (e.g., using a laser curtain). As used herein, the terms "trigger detector," "gating detector," "gate detector," and the like may be used herein to refer to a detector that may be generate a detection signal in response to a fulfillment of a condition(s), for example, detected presence of a droplet. One of detectors 514 and 516 may be an image capture device and the other may be a gate detector. Controller 512 may determine properties of stream of target material 518 based on the signal from detector 514. Properties of the stream of target material 518 may comprise, for example, velocity profile of the droplet stream at the detection point, gap (time and/or distance) between droplets, presence of uncoalesced droplets (satellite droplets, or simply "satellites"), droplet size, coalescence length, and the like. Controller 512 may use the information from detectors 514 and/or 516 to generate a feedback signal to control operation of the waveform generator 506.

In some embodiments, controller 512 may adjust parameters of electrical signals (e.g., waveform, hybrid waveform) generated by waveform generator 506. Parameters of waveforms may comprise, for example, relative phase difference (s) between two or more waveforms in superposition, amplitude, wavelength, and the like. Controller 512 may also determine an adjustment of a waveform parameter based on an external input 520, which may originate from another controller or be based on a user input.

In some embodiments, shroud 510 may be disposed on nozzle 502. Shroud 510 may be disposed so as to cover and protect stream of target material 518 from forces that may disrupt coalescence and droplet generation.

In some embodiments, waveform generator 506 is configured to generate an electrical signal to control the applied pressure on nozzle 502. The electrical signal may comprise a superposition (e.g., hybrid waveform) of a first periodic waveform having a first frequency (e.g., a low frequency sine wave) and a second periodic waveform having a second frequency different from the first frequency (e.g., a high frequency square wave). The term "sine" may be used herein to refer to sinusoidal patterns. The second frequency may be an integer multiple of the first frequency. The resulting velocity perturbations in stream of target material 518 allow the initial droplets that are ejected from nozzle 502 to coalesce as they travel away from nozzle 502. A fully coalesced droplet 522 may form at a distance L ("coalescence length") from the orifice of nozzle 502. In other words, a distance, measured from the nozzle, at which fully coalesced droplet 522 forms without remnant uncoalesced droplets (e.g., satellites) defines a coalescence length.

In some embodiments, the coalescence length may be adjusted by adjusting parameters of the electrical signal from waveform generator 506 (e.g., relative phase of waveforms), which ultimately influences coalescence behavior via velocity perturbations of the initial droplets (additional details regarding the use of hybrid waveforms in coalescence-based droplet generation may be found in International Appl. No. WO 2019/137846). Initial droplets may be generated at a rate of, for example, approximately $5\times10^6$ initial droplets per second (e.g., frequency of 5 MHz). The frequency of initial droplets may be a function of, for example, the size of the orifice on nozzle 502 (or capillary 508) and a so-called Rayleigh breakup phenomenon, and may be influenced by pressure variations induced by electromechanical element 504 on target material fluid flowing within capillary 508. In some embodiments, source material delivery system 500 generates fully coalesced droplets 522 having a lower frequency (e.g., 50 kHz) and without any satellites—from the initial droplets of a higher frequency (e.g., 5 MHz).

In some embodiments, source material delivery system 500 is configured to control the breakup/coalescence process to reduce instabilities in the EUV-generating-plasma. It may be instructive to first describe some factors that can influence droplet coalescence. Referring back to FIG. 3, an EUV radiation source may employ gas dispenser device 320 to introduce a gas flow (e.g., hydrogen gas) into irradiation region 304. The gas flow from gas dispenser device 320 may introduce drag to the droplets in stream of target material 518 (FIG. 5), thereby affecting the velocities of droplets. Therefore, the coalescence process—being very dependent on the velocity perturbation of droplets—may be substantially impacted by the presence of gas. A reason for using gas may be for allowing some useful features. For example, the gas may be used as a chemical radical for cleaning collector optic 258. More details regarding the use of hydrogen gas may be found in U.S. Pat. No. 10,359,710, issued on Jan. 18, 2011, titled "Radiation System and Optical Device," which is incorporated by reference herein in its entirety. For the use of at least these features, drag may be tolerated in some embodiments.

Plasma forces may also affect coalescence. The EUV-generating-plasma can be characterized as a complex flow of ionized matter. Therefore, droplets in the vicinity of the EUV-generating-plasma may be subject to electromagnetic and fluid-mechanical forces. Consequently, uncoalesced droplets may not be able to fully coalesce if they are still in fragmented form (e.g., satellites) by the time they enter the influence of the plasma forces. The presence of satellites at irradiation region 304 may impact stability of EUV-generation, which in turn may be undesirable for lithographic processes that depend on precise energy dosages from the EUV source.

In some embodiments, it is desirable for fully coalesced droplets to form prior to arrival at irradiation region 304, and in particular, substantially at or before reaching a given distance from irradiation region 304. In some embodiments, full coalescence of droplets at a given distance away from irradiation region 304 may be achieved by positioning source material delivery system 308 (or its nozzle, e.g., nozzle 502 of FIG. 5) further away from irradiation region 304. A nozzle has a range of possible coalescence lengths (e.g., having a minimum and/or maximum) based on, for example, parameters of the electrical signal from waveform generator 506 (FIG. 5). A maximum coalescence length of source material delivery system 308 may be, for example, approximately 700 mm. Therefore, the tip of such a nozzle would need to be placed at least 700 mm away from irradiation region 304 for full coalescence of droplets prior to arriving at irradiation region 304. However, there may exist reasons that caution against placing the nozzle at such distances from irradiation region 304. For example, aiming the droplets precisely and reproducibly for intersection with a laser is desirable for EUV-generation stability. However, as source material delivery system 308 is positioned further away, the droplets may be under the influence of drag for longer periods of time, leading to higher uncertainties in the aim of coalesced droplet and sub-optimal interaction between the droplets and the laser. Therefore, the method to position source material delivery system 308 further away from irradiation region 304 may have limits.

Alternatively, or in addition to, the method of positioning a source material delivery system further away from an irradiation region, embodiments of the present disclosure allow for manipulation of the maximum coalescence length of a source material delivery system. In some embodiments, a maximum coalescence length is decreased as much as possible.

As used herein, the term "maximum coalescence length" may be used to describe a maximum distance, measured from a source material delivery system (e.g., from a nozzle thereof), at which fully coalesced droplets form without remnant uncoalesced droplets (satellites). Moreover, the maximum coalescence length may refer to a maximum of a range of coalescence lengths (e.g., a range may be determined by adjusting a single parameter of the source material delivery system while keeping other parameters fixed, as described further below). The term "minimum coalescence length" follows a logic similar to the maximum coalescence length.

Earlier it was described that a coalescence length of a source material delivery system may be manipulated using a superposition of a first periodic waveform (e.g., a low frequency sine wave) and a second periodic waveform (a high frequency square wave) as an electrical signal to actuate an electromechanical element on the source material delivery system. For simplifying descriptions that follow, the first and second periodic waveform will be respectively referred to as sine and square waves. However, this should not be interpreted as limiting and it should be understood that other suitable waveforms for the first and second periodic waveforms may be envisioned. For example, a triangle wave, a sawtooth wave, sharp periodic peaks (e.g., periodic delta-like), and/or variants thereof may be used.

In some embodiments, the range of coalescence lengths of a source material delivery system may be a function of at least the amplitude of the sine wave, frequency of the square wave, and/or a relative phase difference between the sine and square waves. With the coalescence length being multi-parameter dependent, it should be appreciated that it may be simpler to consider adjusting only one knob (e.g., an adjustable parameter), while leaving other knobs fixed, when examining the coalescence length and quantities derived therefrom. For example, the range of coalescence lengths with respect to the full range of relative phase difference of the sine and square waves (e.g., 0-2π radians or 0-360 degrees of the square wave) may be examined for a given value of the amplitude of the sine wave. For this given value of the sine wave amplitude, it is possible to determine a minimum and maximum of the coalescence length over the full range of the relative phase between the sine wave and the square wave. If, for example, a different sine wave amplitude is under consideration, then examining the range of coalescence lengths, with respect to the full range of relative phase difference of the sine and square waves, may result in a new range of coalescence lengths, along with a new minimum and maximum. In this manner, the maximum coalescence length with respect to a given knob may be a variable (and adjustable) quantity when another knob is adjusted.

In some embodiments, for frequencies of the square wave below, e.g., 1 MHz, the amplitude of the sine wave may appreciably influence the maximum coalescence length. However, at frequencies of the square wave above 1 MHz (e.g., 2 MHz), the dependence of the maximum coalescence length on the sine wave amplitude may be considerably negligible (e.g., flat line), for a given range of a sine wave amplitudes. Waveform amplitudes may be measured in, for example, voltages of the electrical signal from a waveform generator (e.g., waveform generator 506 of FIG. 5). Sine wave amplitudes that may be used in embodiments herein may be, for example, values between approximately 0.1-10.0, 0.1-6.0, 0.5-5.0, or 1.0-4.0 V.

In some embodiments, having a flat line behavior with respect to changes of the sine wave amplitude may allow not having to tune or optimize the sine wave amplitude at all. The ability to not have to tune knobs of an EUV source unit allows for confident deployment of the system without having to further tune them in the field. Having working configurations out of the factory may save on setup costs, field downtime, and further maintenance.

In some embodiments, the presence of drag may also contribute to shortening the maximum coalescence length. Traditionally, the impact of gas flow at the plasma formation region in an EUV source may have been seen as a minor inconvenience of sorts, where the difficulties of accommodating the presence of gas are outweighed by the features it allows. However, some embodiments of the present disclosure make novel use of the drag imparted on droplets in the stream of target material.

In some embodiments, drag may be used to limit the maximum coalescence length. Nozzle 502 may eject initial droplets of target material through the gas (e.g., provided by gas dispenser device 320, FIG. 3) such that the initial droplets experience drag. During the coalescence process, a first set of intermediate droplets are formed by coalescing. The term "intermediate droplet" may be used herein to describe droplets that have coalesced from the initial droplets but have not yet achieved the final form for interacting with the laser for EUV generation. Fully coalesced droplet 522 (FIG. 5) is an example of the final form. As intermediate droplets merge to form larger intermediate coalesced droplets, there may be instances where some intermediate droplets are larger than others. Deceleration due to the drag force may be greater on smaller droplets. Therefore, the drag mechanism may be used to slow down smaller droplets such that they collide with larger droplets. The intermediate droplets may arise at a frequency that is based on the frequency of the square wave. By increasing the ratio of the frequency of the square wave to the frequency of the sine wave, smaller and more intermediate droplets may be generated. Consequently, the deceleration due to drag may be greater on the smaller droplets, leading to quicker coalescence.

In some embodiments, gas parameters may be adjusted to adjust the maximum coalescence length. For example, an illumination system that employs source material delivery system 500 (FIG. 5) may adjust the maximum coalescence length by adjusting at least a density or temperature of the gas. Increasing the density of the gas (e.g., injecting more gas), the temperature of the gas, or both, may increase the effects of drag to shorten the maximum coalescence length.

Figure 6:
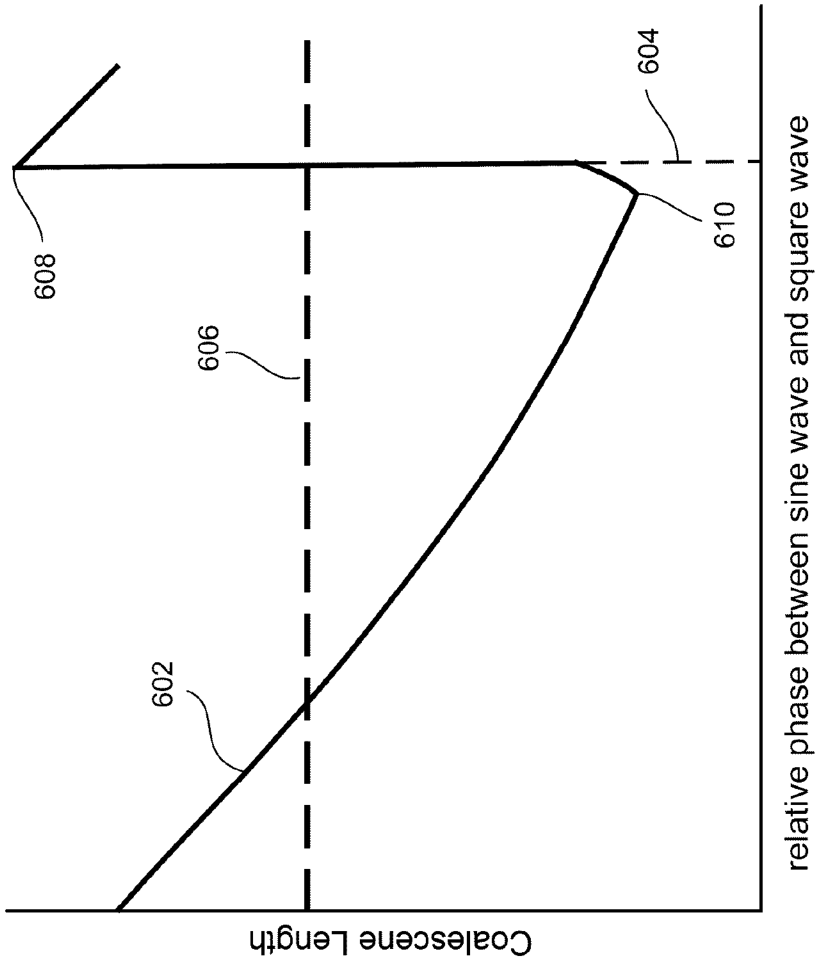
FIG. 6 shows a plot of coalescence length versus the relative phase between a sine wave and a square wave, according to some embodiments.

It may be instructive to describe some details of the maximum coalescence length from the perspective of varying the relative phase difference of the sine and square waves. FIG. 6 shows a plot 602 of the coalescence length versus the relative phase between the sine wave and the square wave (or simply relative phase), according to some embodiments. The vertical axis represents a coalescence length (in arbitrary units). The horizontal axis represents a relative phase spanning at least a full revolution of the relative phase (e.g., 0-360°). Plot 602 represents the coalescence length of, e.g., source material delivery system 500 (FIG. 5). It is to be understood that plot 602 is a simplified, qualitative representation of actual observed behaviors on an actual system where all knobs other than the relative phase are fixed at given values (e.g., frequency of square wave fixed at 500 kHz) and drag is present. In some embodiments, plot 602 shows that the coalescence length of source material delivery system 500 (FIG. 5) is approximately linear with respect to the relative phase between the sine wave and the square wave. However, plot 602 suddenly becomes discontinuous at a particular value of the relative phase. The particular value or subset of values where discontinuity occurs may be referred to herein as a "jump boundary" 604 (shown as a dashed vertical line). Adjusting the amplitude of the sine wave can shift the location of jump boundary 604 along the horizontal axis.

In some embodiments, jump boundaries may occur due to the influence of drag on the droplets. For example, some values of the relative phase may cause some intermediate droplets to coalesce with a droplet to the front and other intermediate droplets to coalesce with a droplet behind (in this example, "front" is defined by the direction of droplet-travel). The jump boundary may occur when intermediate droplets transition from merging forward to merging backward, or vice versa, as the relative phase is adjusted.

In some embodiments, dashed horizontal line represents a tolerance 606 of source material delivery system 500 (FIG. 5). Tolerance 606 may be dependent on, for example, nozzle positioning (e.g., not too far from irradiation region 304 (FIG. 3), for aiming purposes). To ensure that uncoalesced droplets avoid plasma forces, in some embodiments, tuning may be performed. For example, the coalescence length of source material delivery system 500 may be set below tolerance 606. In other words, a tuning measurement may be performed in order to determine a relative phase that corresponds to a coalescence length that does not exceed tolerance 606. However, if the selected relative phase is near jump boundary 604, then the coalescence length of source material delivery system 500 may be highly unstable, jittering between a maximum coalescence length 608 and a minimum coalescence length 610, which may then result in unstable EUV-generation.

In some embodiments, tuning may be difficult to perform under true operational conditions (e.g., laser and EUV plasma are on). Therefore, tuning may be performed in a non-plasma environment. However, in this scenario, activating the laser and EUV plasma at a later time may result in plot 602 being modified. The presence of an EUV plasma may influence coalescence behavior, for example, jump boundary 604 may become shifted. In some cases, tuning performed in non-plasma conditions may be rendered inadequate once EUV production is initiated, and source material delivery system 500 may subsequently operate at a jump boundary that has been unpredictably shifted.

Embodiments may be envisioned where tuning is unnecessary, for example, by selecting parameters of source material delivery system 500 that shift the entirety of plot 602 below tolerance 606.

In some embodiments, a camera-based detector (e.g., detector 514) may be used to capture images of droplets to measure coalescence lengths and generate plot 602. Coalescence length may correspond to the condition where the final satellite is absorbed to form a fully coalesced droplet (e.g., absence of satellite in the image). The detector may be configured to capture images along the path of stream of droplets to determine the distance, measured from nozzle 502 (FIG. 5), at which satellites are absent. A processor (e.g., controller 512 of FIG. 5) may determine the coalescence length based on the signal from the detector to generate plot 602. The processor may be configured to determine at least jump boundary 604, maximum coalescence length 608, minimum coalescence length 610, and/or other extractable information.

Figure 7:
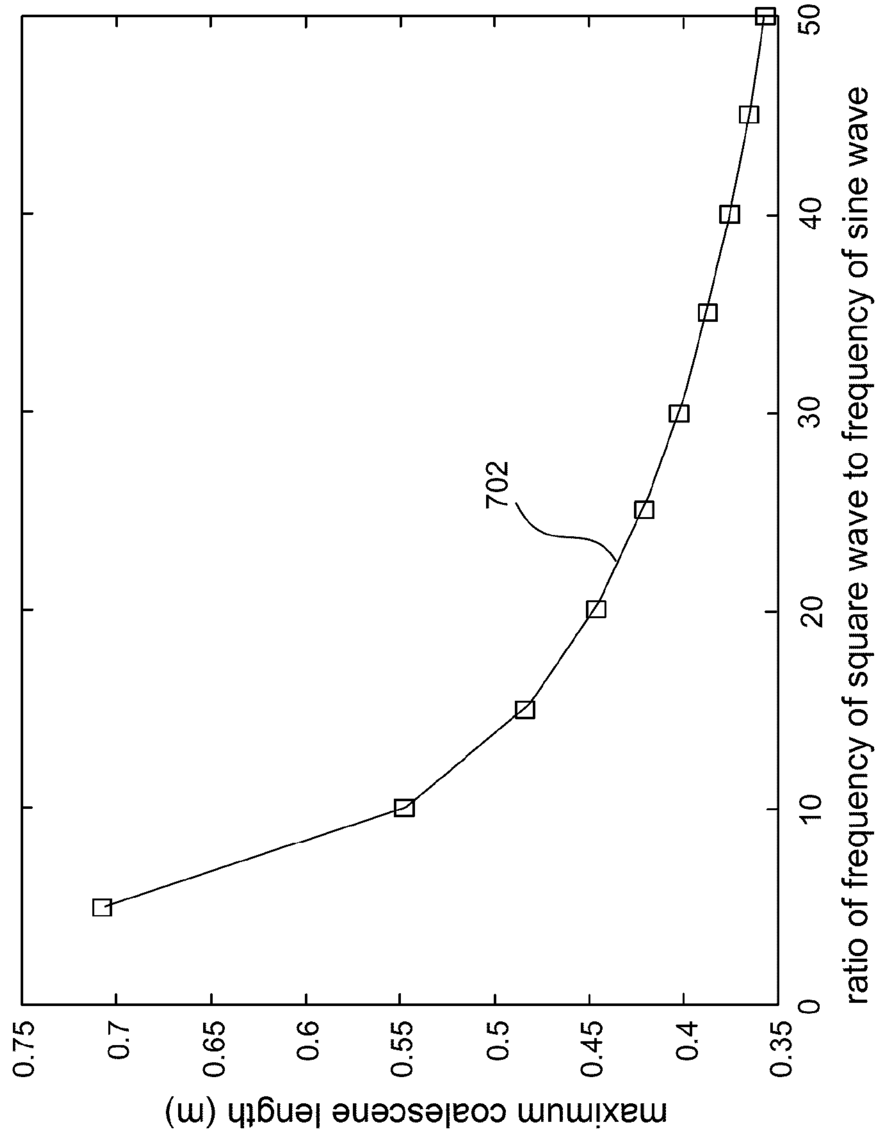
FIG. 7 shows a plot of maximum coalescence length versus the ratio of a frequency of a square wave to a frequency of a sine wave, according to some embodiments.

FIG. 7 shows a plot 702 of the maximum coalescence length versus the ratio of the frequency of the square wave to the frequency of the sine wave, according to some embodiments. The vertical axis represents a maximum coalescence length (e.g., in meters—not limiting). The horizontal axis represents a ratio of the frequency of the square wave to the frequency of the sine wave. Plot 702 represents the maximum coalescence length of, e.g., source material delivery system 500 (FIG. 5). It is to be understood that plot 702 is a simulated representation of actual observed behaviors of a source material delivery system in which all knobs other than the frequency of the square wave and relative phase between the sine wave and the square wave are fixed at given values and drag is present. It is to be appreciated that, for each data point of plot 702, the relative phase is set to wherever the maximum coalescence length occurs (e.g., the peak where maximum coalescence length 608 occurs in FIG. 6). In some embodiments, plot 702 shows that the maximum coalescence length is approximately inversely proportional to the ratio of the frequency of the square wave to the frequency of the sine wave.

In some embodiments, the simulation may be performed numerically based on ordinary differential equations of motion in the presence of drag. The number of initial droplets to consider is N, where the mass of each initial droplet is 1/N of the final, fully coalesced droplet. Each droplet (initial and intermediate) may be subject to a drag force that depends on each droplet's projected area normal to the direction of motion, droplet velocity, and the viscosity of the gas. Initial conditions may be those set by the nozzle (e.g., initial velocity and frequency of initial droplets). The coalescence length is then defined as the distance from the nozzle at which the final intermediate droplets coalesce to form the fully coalesced droplet.

In some embodiments, by suitable selection of the ratio of the frequency of the square wave to the frequency of the sine wave, the maximum coalescence length of source material delivery system 500 may be, for example, less than approximately 500 mm, less than approximately 450 mm, less than approximately 400 mm, less than approximately 350 mm, less than approximately 300 mm, or less than approximately 250 mm.

In some embodiments, a ratio of the frequency of the square wave to the frequency of the sine wave may be 40 (e.g., 2 MHz square wave to 50 kHz sine wave). The ratio of the frequency of the square wave to the frequency of the sine wave may be between approximately 20-150, between approximately 20-120, between approximately 20-100, between approximately 20-80, between approximately 20-60, between approximately 30-150, between approximately 40-150, between approximately 50-150, between approximately 80-150, between approximately 100-150, between approximately 30-120, between approximately 40-100, or between approximately 40-80.

In some embodiments, the rate at which coalesced droplets cross irradiation region 304 (FIG. 3) is based on the frequency of the sine wave (e.g., the first periodic waveform generated by waveform generator 506 of FIG. 5). In the context of droplet travel, the term "crossing" may be used herein to describe droplets passing through a given space (e.g., droplets crossing a laser curtain). For example, the term "crossing time interval" (or simply "crossing interval") may refer to a time interval between crossings of coalesced droplets past a given space (e.g., a laser curtain) and its inverse quantity may be a "crossing frequency." In some embodiments, each of the coalesced droplets has a substantially similar velocity and gap therebetween (gap may refer to, for example, a distance or a crossing interval). The frequency of the sine wave may be between approximately 30-90 kHz, between approximately 30-70 kHz, or between approximately 70-90 kHz. The frequency of the sine wave may be approximately 40, 45, 50, 55, 60, 65, 70, 75, or 80 kHz. The frequency of the square wave may be an integer multiple of the frequency of the sine wave, which may ensure that the electrical signal conveying the hybrid waveform is repeatable from one sine crest to the next.

Figure 8:
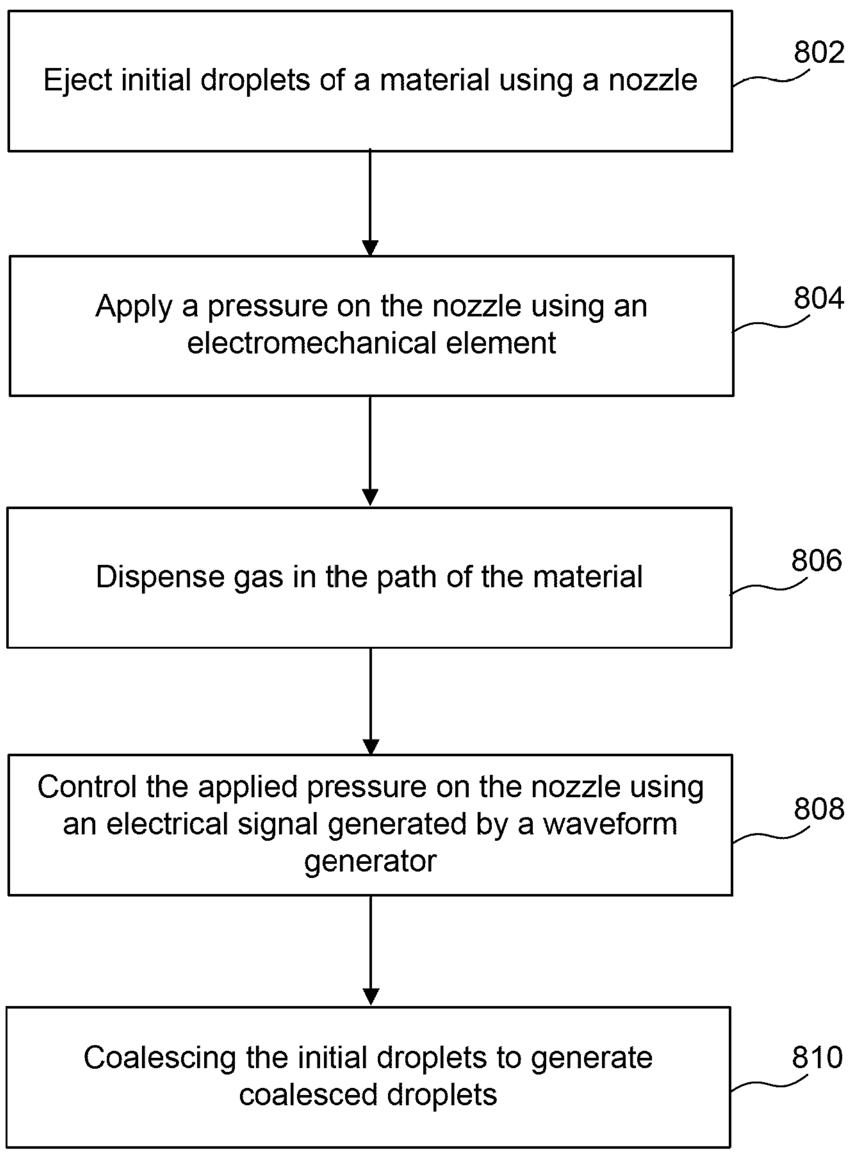
FIG. 8 shows method steps for performing functions a source material delivery system, according to some embodiments.

FIG. 8 shows method steps for performing functions as described in reference to FIGS. 1-7, according to some embodiments. At step 802, droplets may be ejected using a nozzle. At step 804, a pressure may be applied on the nozzle using an electromechanical element. At step 806, gas may be dispensed in the path of the material. At step 808, the applied pressure on the nozzle may be controlled using an electrical signal generated by a waveform generator. The electrical signal may comprise a first periodic waveform and a second periodic waveform and the second periodic waveform may comprise a frequency between approximately 1-4 MHz. At step 810, the initial droplets may be coalesced to generate coalesced droplets. The coalescing may be based on the first and second periodic waveforms. A distance, measured from the nozzle, at which the coalesced droplets form without remnant uncoalesced droplets defines a maximum coalescence length. The maximum coalescence length may be less than approximately 500 mm.

The method steps of FIG. 8 may be performed in any conceivable order and it is not required that all steps be performed. Moreover, the method steps of FIG. 8 described above merely reflect an example of steps and are not limiting. That is, further method steps and functions may be envisioned based upon embodiments described in reference to FIGS. 1-7, as well as FIGS. 9-12 described below.

For the following discussion, reference will be made to features in FIGS. 3, 5, 6, and 7, where the left-most digit(s) of a reference number identifies the figure in which the reference number first appears. Returning to the topic of EUV instabilities, it was discussed above that operating source material delivery system 500 at or near jump boundary 604 may cause the coalescence length of source material delivery system 500 to be highly unstable. The instability may be due to source material delivery system 500 jittering between a maximum coalescence length and a minimum coalescence length, resulting in unstable EUV-generation. For example, a trigger-by-droplet-detection mechanism may be used for triggering laser system 302. By detecting the time between passing of droplets (e.g., crossing interval), laser system 302 may be triggered based on the detected timing to guarantee that the laser pulse intersects the coalesced droplet at the primary focus (e.g., irradiation region 304) every time to ensure a constant EUV power output.

In some embodiments, the crossing interval may be determined using an image capture device (e.g., detector 514). It should be appreciated that an image detector may have a limited cone or field of view. Detector 514 may be aligned to observe an area where fully coalesced droplet 522 is expected to form—that is, the approximate location at which the last intermediate satellite droplets merge to form fully coalesced droplet 522. The location observed by detector 514 may not necessarily be irradiation region 304 since, as discussed in some embodiments, it may be preferable that fully coalesced droplets 522 form prior to reaching irradiation region 304. Controller 512 may analyze a detection signal from detector 514 to estimate an average crossing interval.

In some embodiments, the crossing interval may be obtained, for example, by analyzing multiple images that show instances of satellite droplets as well as fully coalesced droplet 522 (further along its travel path), the distance of the observed area to the orifice of nozzle 502, and the frequency of crossings of fully coalesced droplet 522. In a scenario in which source material delivery system 500 operates using stable parameters (e.g., not close to jump boundary 604), laser system 302 may be triggered based on timings determined by controller 512. In this manner, the degree of confidence that the laser pulse will intersect an incoming fully coalesced droplet 522 may be quite high. In a scenario in which source material delivery system 500 operates close to jump boundary 604, the uncertainty in crossing intervals may be drastically elevated, which can lead to poor intersection of laser pulses and fully coalesced droplets 522. The resulting fluctuations in EUV power output may lead to unstable radiation dosage for lithographic processes that employ the EUV source, causing imperfect pattern transfers and decreasing production yield rates.

In some embodiments, the uncertainty in crossing intervals may be mitigated to some extent by tracking the crossing interval in real time rather than estimating an average crossing interval. However, since crossings of fully coalesced droplets 522 may be much more frequent than the refresh rate of an image detector (e.g., 10-100 kHz vs. 10-1000 Hz), detector 514 may not be capable of determining the frequency of crossings of fully coalesced droplet 522 since some droplets may evade detection. To supplement the information gleaned from detector 514, a gate detector (e.g., detector 516) may be used for determining the frequency of crossings (or inversely the corresponding crossing interval). Commercially available gate detectors (e.g., a laser curtain) are capable of sampling rates fast enough to exceed the speed of crossings described in embodiments herein. It should be appreciated that image cameras are not precluded from performing crossing interval measurements. There are commercially available high speed cameras that are capable of sampling rates fast enough to film even lightning strikes. However, the example of the gate detector is provided since gate detectors may be orders magnitude more cost-effective and simpler to implement.

In some embodiments, instabilities due to jump boundaries may be eliminated. For example, controller 512 may adjust a knob (e.g., relative phase difference between the sine and square waves) in response to a determination that source material delivery system 500 is exhibiting jump-boundary behavior. The selected value of the knob may be such that source material delivery system 500 may operate away from jump boundary 604. Controller 512 may determine the presence of jump-boundary behavior by analyzing the multiple images and estimating shifts of the coalescence length (the jump boundary is characterized by an abrupt shift of the coalescence length). Controller 512 may also quantify shifts of jump boundary 604.

It was discussed above that, in some embodiments, waveform generator 506 may supply a voltage signal (e.g., a hybrid waveform) to electromechanical element 504 on nozzle 502, and that the resulting distribution of droplet velocities is based on the voltage signal. The actual distribution of droplet velocities may vary from system to system. The variance in the distributions may be due to, for example, the use of non-identical electromechanical elements from system to system—not for a lack of effort in replicating systems, but rather as a result of microscopic uncertainties of electromechanical elements (and/or uncertainties in any of the other structures). Such uncertainties lead to non-identical sensitivities and mechanical response. Therefore, there exists a mutable relationship between a voltage signal and the resulting distribution of droplet velocities. This mutable relationship may be referred to herein by the term "transfer function." In an example, a transfer function may be understood as a quantitative relationship of how a source material delivery system transfers a voltage signal to droplet-velocity perturbations at an orifice of a nozzle. A transfer function may be represented mathematically (e.g., a mathematical function). For example, if a transfer function is invariant with respect to an adjustment of a first knob, then the transfer function may be a constant value as far as concerns that first knob. There may be a second knob different from the first knob for which the transfer function is not constant.

In some embodiments, the transfer function is a useful quantity to measure and ascertain. For example, knowing the transfer function may be used to extrapolate the resulting coalescence behavior based on selected parameters of source material delivery system 500. In a more specific example, the velocity distribution of droplets may be inferred from the transfer function for a broad range of amplitudes used in the hybrid waveform (after all, the transfer function represents a relationship between a voltage signal (e.g., amplitude) and droplet-velocity perturbations). The transfer function may also be used to infer whether source material delivery system 500 is working within tolerances or if it needs to be replaced.

In some embodiments, it may be difficult to measure the transfer function directly—that is, by directly measuring the spread of velocities of the millions of initial droplets that exit the nozzle every second. Therefore, some embodiments described herein provide structures and functions for determining a transfer function indirectly.

In some embodiments, the transfer function of source delivery system 500 may be derived from, for example, shifts of jump boundary 604 as a knob is adjusted. Recall that the distribution of droplet velocities and coalescence behavior are linked And jump boundary 604 informs a transition in coalescence behavior (e.g., droplets transition from merging forward to merging backward, which is related to the distribution of droplet velocities). Therefore, a shifting jump boundary 604 may indicate how a transfer function of source material delivery system 500 evolves with respect to an adjustment of a knob (e.g., an applied voltage amplitude).

It was described above that, in some embodiments, determining shifts to jump boundary 604 may be accomplished by having controller 512 analyze multiple images from detector 514 to determine shifts of the coalescence length. However, some embodiments described herein also described how reducing maximum coalescence length 608 (e.g., by increasing the ratio of the frequency of the square wave to the frequency of the sine wave) may provide desirable features (e.g., avoiding the need for tuning knobs). In doing so, maximum coalescence length 608 may be so reduced to the point that information provided by detector 514 may no longer allow calculating the coalescence length. For example, no satellites are visible to detector 514 owing to fully coalesced droplets 522 forming before they are in the field of view of detector 514. If detector 514 cannot "see" the final merger of satellite droplets, then it remains undetermined as to when or where fully coalesced droplets 522 actually undergo the final merge. That is, coalescence length remains unknown. If coalescence length is undetermined, then an inquiry of jump-boundary behavior may not be initiated based on coalescence-length behavior since the latter is unknown. Therefore, some embodiments described herein provide structures and functions for determining jump-boundary behavior based on measurements and observations of indicators other than coalescence-length behavior.

In some embodiments, controller 512 may determine or quantify jump-boundary behavior by measuring crossing intervals, particularly by measuring an uncertainty of crossing intervals (e.g., standard deviation, 3-sigma, error distribution functions, and the like). For example, detector 516 (e.g., a laser curtain) may generate a detection signal corresponding to time intervals between crossings of droplets at detector 516 (may be fully coalesced droplets 522 or a group of intermediate droplets). So that a group of intermediate droplets on their way to forming fully coalesced droplet 522 is counted as a single crossing event, detector 516 may have a disturbance threshold (e.g., small satellites do not register) and/or controller 512 may analyze the detection signal for an aggregate disturbance over a fixed time period (e.g., an integrated detector disturbance over a 0.1 ms time interval exceeds a threshold).

Figure 9:
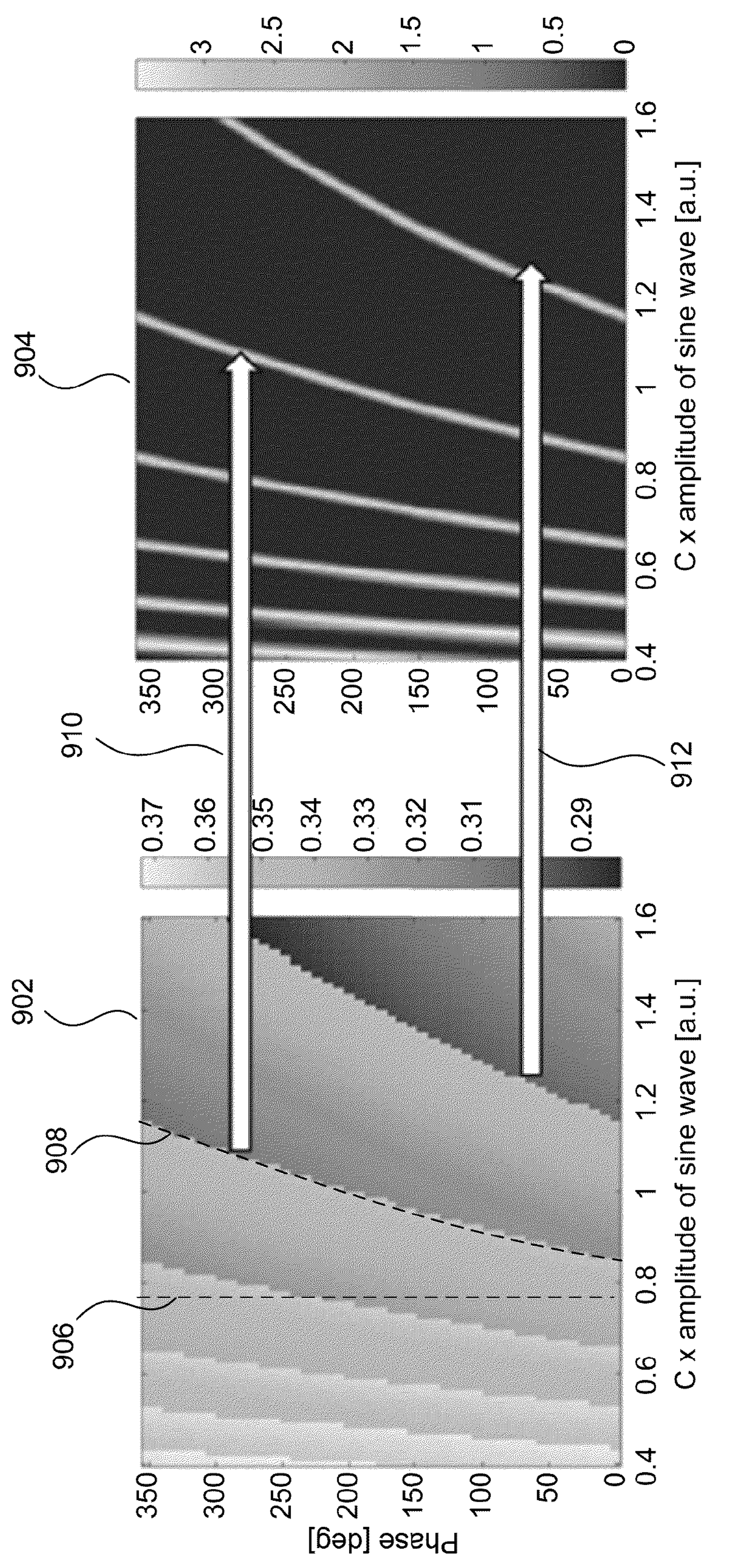
FIG. 9 shows plots that provide relations between coalescence lengths, crossing intervals and crossing interval uncertainties of a source material delivery system, according to some embodiments.

FIG. 9 shows plots 902 and 904, which provide relations between coalescence lengths, crossing intervals and crossing interval uncertainties of source material delivery system 500 (FIG. 5), according to some embodiments. Plot 902 is a 2D intensity map of a spread of coalescence lengths based on two variables. One variable is a relative phase difference between the sine and square waves (e.g., in radians—not limiting), represented by the vertical axis. One full 360 degree revolution of the relative phase difference is shown and it should be appreciated that further revolutions iterate the pattern (same pattern between 360-720 degrees, 720-1080 degrees, and so on). The other variable is a quantity that is proportional to the amplitude of the sine wave (e.g., in arbitrary units), represented by the horizontal axis. And the gradient scale represents a coalescence length (e.g., in arbitrary units), where the coalescence length increases in the direction from black to white. It is to be understood that plot 902 is a simulated representation of actual observed behaviors of a source material delivery system in which all knobs other than (1) the frequency of the square wave and relative phase between the sine wave and the square wave and (2) the amplitude of the sine wave are fixed at given values (and drag is present).

In some embodiments, the quantity represented in the horizontal axis of plot 902 may be one of any that are related to the amplitude of the sine wave via proportionality. For example, the horizontal axis may be rescaled via a constant C to represent a velocity perturbation U (e.g., in meters per second—not limiting), where U=TFxsine_amplitude. Here, TF is the transfer function and has merely replaced C.

In some embodiments, a vertical line 906 represents a slice of the data for a given amplitude of the sine wave. In essence, the plot of FIG. 6, which was generated with the sine amplitude fixed at a given value, is a slice much like the one represented by vertical line 906. For example, in following vertical line 906 from bottom to top, a discontinuity of the coalescence length is encountered. At the discontinuity, the coalescence length jumps suddenly from a low value (darker shade) to a higher value (lighter shade). This is jump boundary 604 (FIG. 6).

In some embodiments, line 908 follows an exemplary jump boundary as the amplitude of the sine wave is adjusted (tracks the shifting of the value of the relative phase difference at which the jump boundary occurs).

In some embodiments, plot 904 is a 2D intensity map of crossing interval uncertainties based on the same variables used in plot 902. That is plot 904 has the same horizontal and vertical axes as plot 902. However, the gradient scale of plot 904 represents a crossing interval uncertainty (e.g., 3-sigma), where the uncertainty increases in the direction from black to white. It is to be understood that plot 904 is simulated similar to how plot 902 is simulated. It can be seen that the jump boundary lines observed in plot 902 are strongly correlated to sudden increases (lighter shade) of the crossing interval uncertainty as shown in plot 904. Block arrows 910 and 912 indicate example correlations.

Therefore, in some embodiments, instead of measuring the coalescence length to determine jump-boundary behavior, it is possible to determine jump-boundary behavior by measuring the crossing interval uncertainty (e.g., by observing a sudden rise of the crossing interval uncertainty). Referencing briefly to FIG. 5, in some embodiments, detector 516 may detect crossings of fully coalesced droplets 522. In the context of crossing interval detection, it should be appreciated that the detection of coalesced droplets also includes detection of groups of intermediate droplets on their way to forming fully coalesced droplet 522 (e.g., provided they are bunched close enough for detector 516 to be unable to resolve individual droplets). Detector 516 may generate a detection signal corresponding to time intervals between crossings of fully coalesced droplets 522 at detector 516. Controller 512 may determine at least first and second ones of the time intervals. Controller 512 may determine a statistical distribution of at least first and second ones of the time intervals. The statistical distribution may comprise an uncertainty of the time intervals. In this manner, controller 512 may determine that source material delivery system 500 is undergoing jump-boundary behavior based on at least a sudden rise in the uncertainty of the time intervals. A parameter of the hybrid waveform (e.g., relative phase between a sine wave and a square wave) may then be adjusted based on the determination that jump-boundary behavior is occurring (e.g., controller 512 may generate commands that are sent to waveform generator 506).

Figure 10:
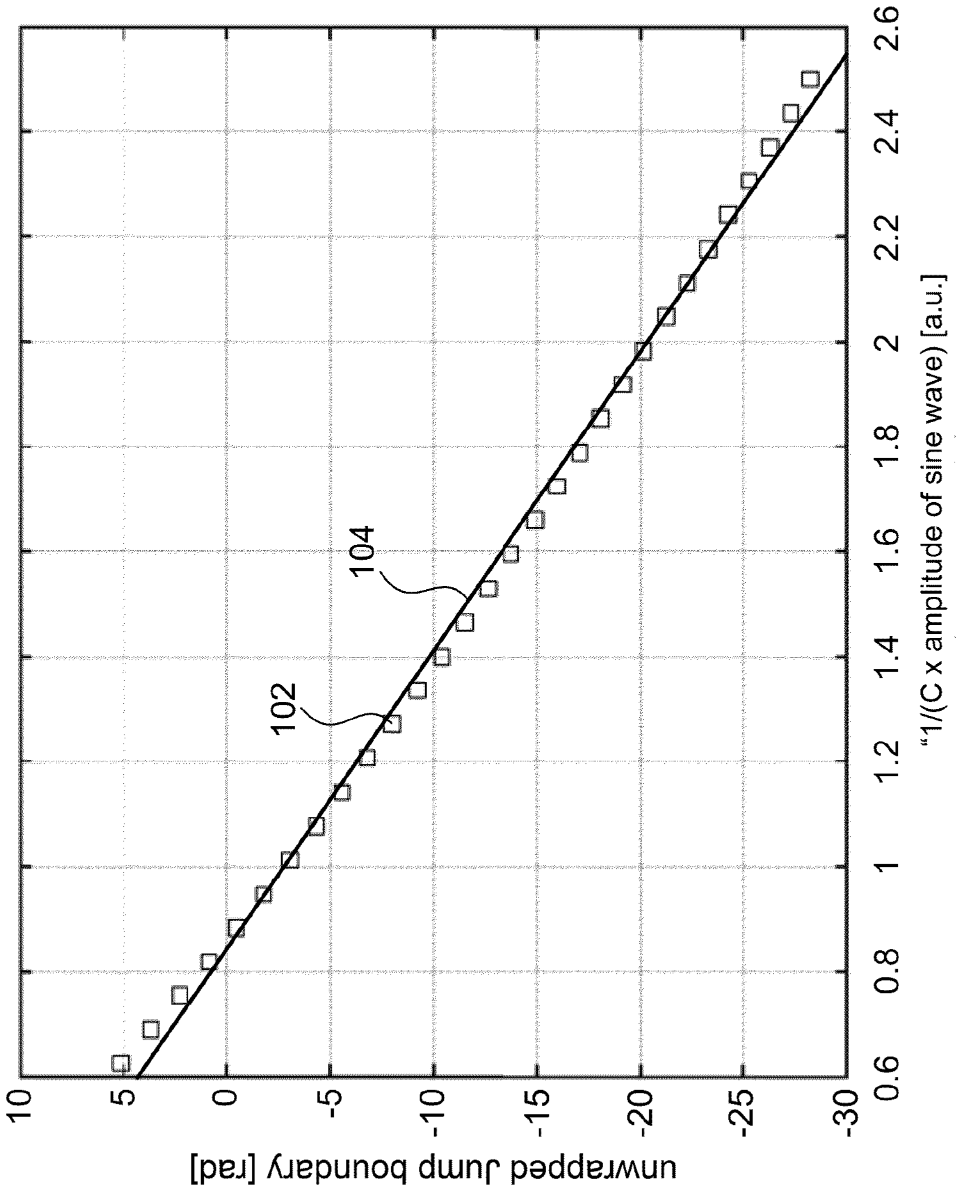
FIG. 10 shows a plot of the value of the relative phase between a sine wave and a square wave at which a jump boundary occurs versus a quantity that is inversely proportional to the amplitude of the sine wave, according to some embodiments.

FIG. 10 shows a plot 1002 of the value of the relative phase between a sine wave and a square wave at which a jump boundary occurs versus a quantity that is inversely proportional to the amplitude of the sine wave, according to some embodiments. The vertical axis is similar to the vertical axes of plots 902 and 904 (FIG. 9) in that it represents the relative phase between a sine wave and a square wave, the difference in FIG. 10 being: (1) the visible extent is expanded to about 12π radians (about six revolutions of the relative phase) and (2) the vertical axis concerns the value of the relative phase that coincides with a jump boundary. The horizontal axis represents an inverse of the quantity that was shown in the horizontal axes of plots 902 and 904, which may be related to the transfer function (see previous explanation of C and TF).

In some embodiments, plot 1002 may be a replot of line 908 (FIG. 9) against a modified horizontal axis (axis values are inverted). Controller 512 may perform a mathematical fit of data points of plot 1002. The fit may be a linear fit 1004. It should be appreciated that a linear fit may be performed based on at least first and second data points. Additional data points may enhance the precision of the fit. Controller 512 may determine the transfer function based on, for example, the slope of linear fit 1004, measured crossing interval values, the known distance between the orifice of nozzle 502 and detector 516, and the like. In this manner, the transfer function can be ascertained based on crossing interval measurements without the need to perform camera inspections for determining coalescence lengths.

Figure 11:
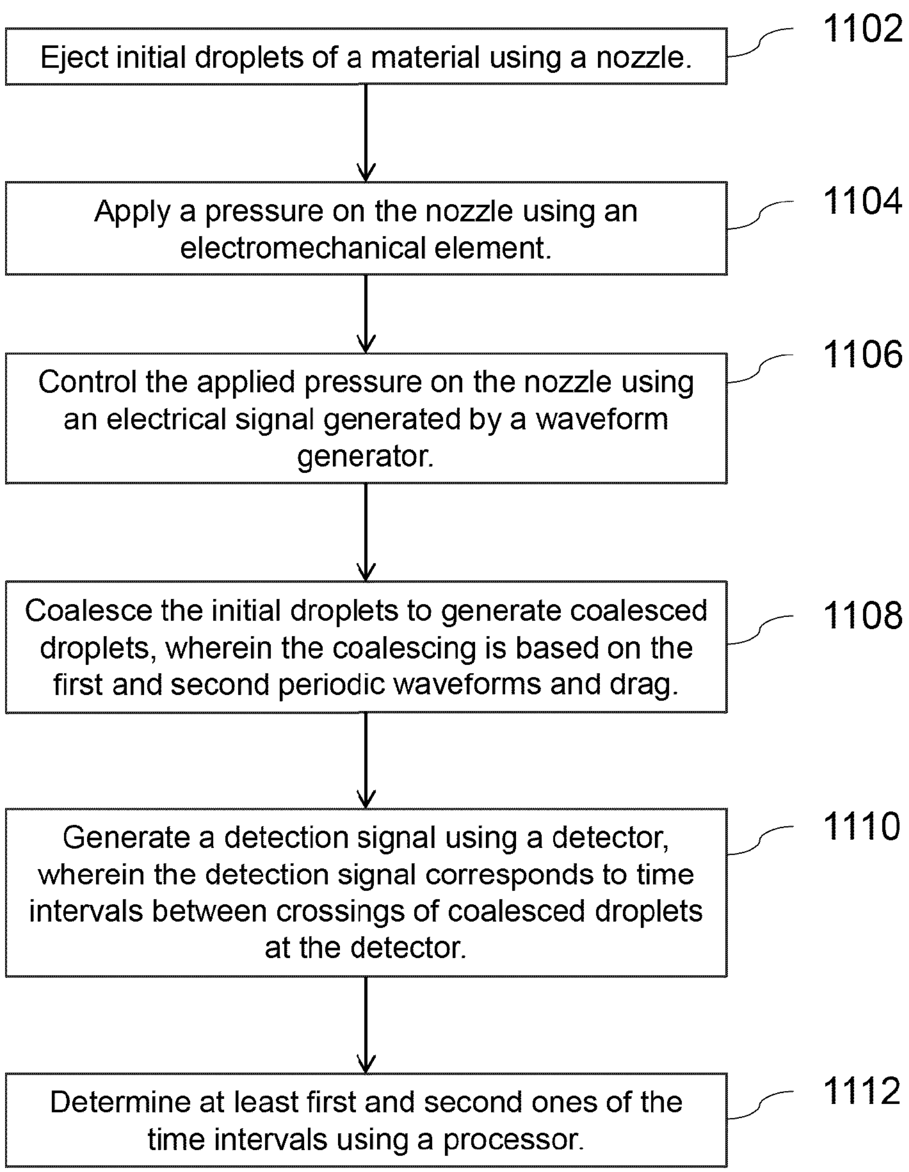
FIG. 11 shows method steps for performing functions as described in reference to FIGS. 1-10, according to some embodiments.

FIG. 11 shows method steps for performing functions as described in reference to FIGS. 1-10, according to some embodiments.

At step 1102, droplets may be ejected using a nozzle.

At step 1104, a pressure may be applied on the nozzle using an electromechanical element.

At step 1106, the applied pressure on the nozzle may be controlled using an electrical signal generated by a waveform generator. The electrical signal comprises a first periodic waveform and a second periodic waveform.

At step 1108, the initial droplets may be coalesced to generate coalesced droplets. The coalescing may be based on the first and second periodic waveforms and drag.

At step 1110, a detection signal may be generated using a detector. The detection signal may correspond to time intervals between crossings of coalesced droplets at the detector.

At step 1112, at least first and second ones of the time intervals may be determined using a processor.

The method steps of FIG. 11 may be performed in any conceivable order and it is not required that all steps be performed. Moreover, the method steps of FIG. 11 described above merely reflect an example of steps and are not limiting. That is, further method steps and functions may be envisioned based upon embodiments described in reference to FIGS. 1-10, and 12.

Figure 12:
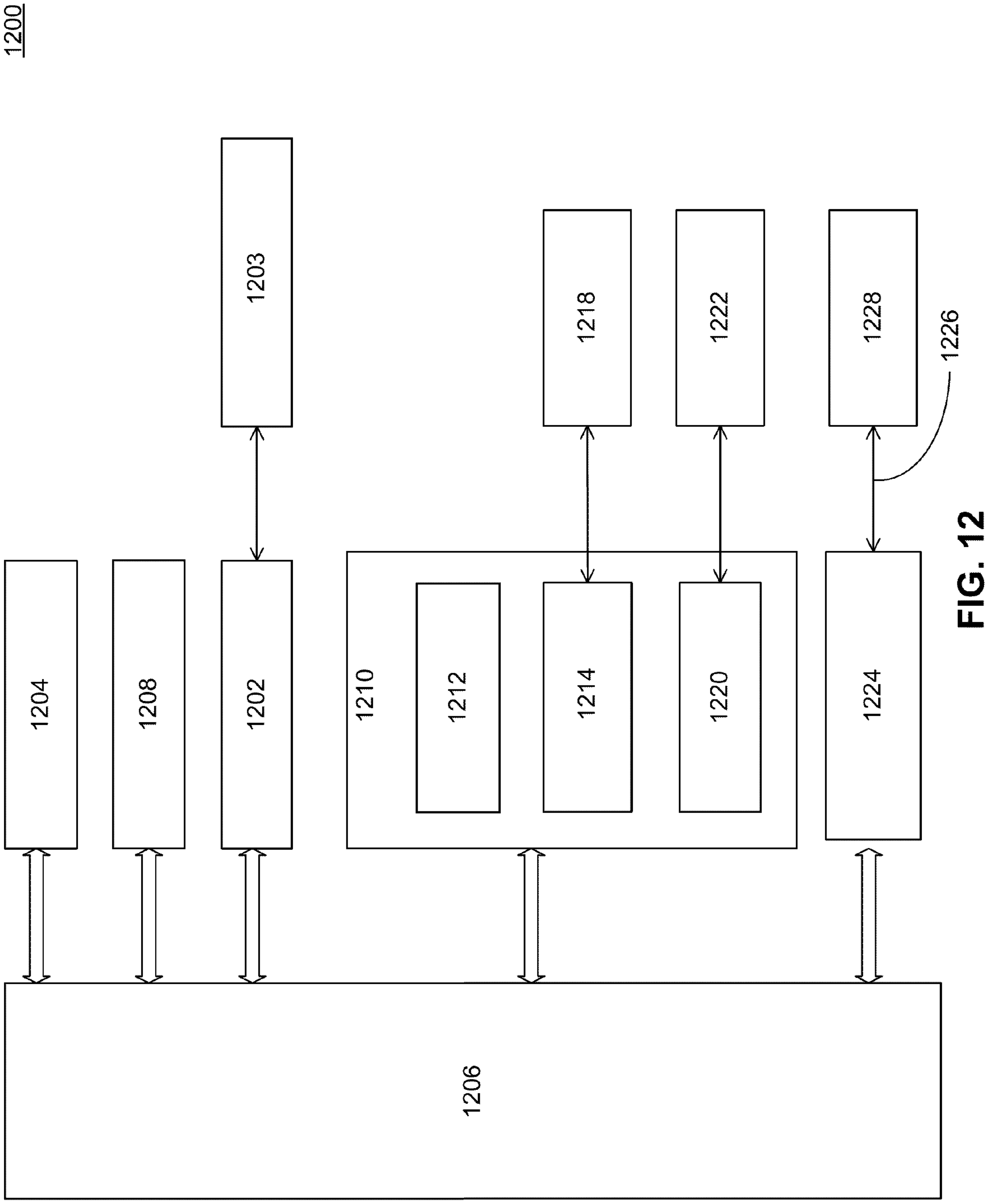
FIG. 12 shows a computer system, according to some embodiments.

Various embodiments may be implemented, for example, using one or more well-known computer systems, such as computer system 1200 shown in FIG. 12. One or more computer systems 1200 may be used, for example, to implement any of the embodiments discussed herein, as well as combinations and sub-combinations thereof.

Computer system 1200 may include one or more processors (also called central processing units, or CPUs), such as a processor 1204. Processor 1204 may be connected to a communication infrastructure or bus 1206.

Computer system 1200 may also include customer input/output device(s) 1203, such as monitors, keyboards, pointing devices, etc., which may communicate with communication infrastructure 1206 through customer input/output interface(s) 1202.

One or more of processors 1204 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1200 may also include a main or primary memory 1208, such as random access memory (RAM). Main memory 1208 may include one or more levels of cache. Main memory 1208 may have stored therein control logic (i.e., computer software) and/or data.

Computer system 1200 may also include one or more secondary storage devices or memory 1210. Secondary memory 1210 may include, for example, a hard disk drive 1212 and/or a removable storage device or drive 1214. Removable storage drive 1214 may be a floppy disk drive, a magnetic tape drive, a compact disk drive, an optical storage device, tape backup device, and/or any other storage device/drive.

Removable storage drive 1214 may interact with a removable storage unit 1218. Removable storage unit 1218 may include a computer usable or readable storage device having stored thereon computer software (control logic) and/or data. Removable storage unit 1218 may be a floppy disk, magnetic tape, compact disk, DVD, optical storage disk, and/any other computer data storage device. Removable storage drive 1214 may read from and/or write to removable storage unit 1218.

Secondary memory 1210 may include other means, devices, components, instrumentalities or other approaches for allowing computer programs and/or other instructions and/or data to be accessed by computer system 1200. Such means, devices, components, instrumentalities or other approaches may include, for example, a removable storage unit 1222 and an interface 1220. Examples of the removable storage unit 1222 and the interface 1220 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1200 may further include a communication or network interface 1224. Communication interface 1224 may enable computer system 1200 to communicate and interact with any combination of external devices, external networks, external entities, etc. (individually and collectively referenced by reference number 1228). For example, communication interface 1224 may allow computer system 1200 to communicate with external or remote devices 1228 over communications path 1226, which may be wired and/or wireless (or a combination thereof), and which may include any combination of LANs, WANs, the Internet, etc. Control logic and/or data may be transmitted to and from computer system 1200 via communication path 1226.

Computer system 1200 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1200 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1200 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1200, main memory 1208, secondary memory 1210, and removable storage units 1218 and 1222, as well as tangible articles of manufacture embodying any combination of the foregoing. Such control logic, when executed by one or more data processing devices (such as computer system 1200), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 12. In particular, embodiments can operate with software, hardware, and/or operating system implementations other than those described herein.

Although specific reference can be made in this text to the use of lithographic apparatus in the manufacture of ICs, it should be understood that the lithographic apparatus described herein may have other applications, such as the manufacture of integrated optical systems, guidance and detection patterns for magnetic domain memories, flat-panel displays, LCDs, thin-film magnetic heads, etc. The skilled artisan will appreciate that, in the context of such alternative applications, any use of the terms "wafer" or "die" herein can be considered as synonymous with the more general terms "substrate" or "target portion", respectively. The substrate referred to herein can be processed, before or after exposure, in for example a track unit (a tool that typically applies a layer of resist to a substrate and develops the exposed resist), a metrology unit and/or an inspection unit. Where applicable, the disclosure herein can be applied to such and other substrate processing tools. Further, the substrate can be processed more than once, for example in order to create a multi-layer IC, so that the term substrate used herein may also refer to a substrate that already contains multiple processed layers.

Although specific reference may have been made above to the use of embodiments of the present disclosure in the context of optical lithography, it will be appreciated that the present disclosure can be used in other applications, for example imprint lithography, and where the context allows, is not limited to optical lithography. In imprint lithography a topography in a patterning device defines the pattern created on a substrate. The topography of the patterning device can be pressed into a layer of resist supplied to the substrate whereupon the resist is cured by applying electromagnetic radiation, heat, pressure or a combination thereof. The patterning device is moved out of the resist leaving a pattern in it after the resist is cured.

It is to be understood that the phraseology or terminology herein is for the purpose of description and not of limitation, such that the terminology or phraseology of the present disclosure is to be interpreted by those skilled in relevant art(s) in light of the teachings herein.

The terms "radiation," "beam," "light," "illumination," and the like as used herein may encompass all types of electromagnetic radiation, for example, ultraviolet (UV) radiation (for example, having a wavelength $\lambda$, of 365, 248, 193, 157 or 126 nm), extreme ultraviolet (EUV or soft X-ray) radiation (for example, having a wavelength in the range of 5-100 nm such as, for example, 13.5 nm), or hard X-ray working at less than 5 nm, as well as particle beams, such as ion beams or electron beams. Generally, radiation having wavelengths between about 400 to about 700 nm is considered visible radiation; radiation having wavelengths between about 780-3000 nm (or larger) is considered IR radiation. UV refers to radiation with wavelengths of approximately 100-400 nm. Within lithography, the term "UV" also applies to the wavelengths that can be produced by a mercury discharge lamp: G-line 436 nm; H-line 405 nm; and/or, Mine 365 nm. Vacuum UV, or VUV (i.e., UV absorbed by gas), refers to radiation having a wavelength of approximately 100-200 nm. Deep UV (DUV) generally refers to radiation having wavelengths ranging from 126 nm to 428 nm, and in some embodiments, an excimer laser can generate DUV radiation used within a lithographic apparatus. It should be appreciated that radiation having a wavelength in the range of, for example, 5-20 nm relates to radiation with a certain wavelength band, of which at least part is in the range of 5-20 nm.

The term "substrate" as used herein describes a material onto which material layers are added. In some embodiments, the substrate itself can be patterned and materials added on top of it may also be patterned, or may remain without patterning.

Although specific reference can be made in this text to the use of the apparatus and/or system according to the present disclosure in the manufacture of ICs, it should be explicitly understood that such an apparatus and/or system has many other possible applications. For example, it can be employed in the manufacture of integrated optical systems, guidance and detection patterns for magnetic domain memories, LCD panels, thin-film magnetic heads, etc. The skilled artisan will appreciate that, in the context of such alternative applications, any use of the terms "reticle," "wafer," or "die" in this text should be considered as being replaced by the more general terms "mask," "substrate," and "target portion," respectively.

Further embodiments according to the present disclosure are described in the below numbered clauses:

1. A system comprising:
   - a nozzle configured to eject initial droplets of a material through a gas;
   - an electromechanical element disposed on the nozzle and configured to apply a pressure on the nozzle; and a waveform generator electrically coupled to the electromechanical element and configured to generate an electrical signal to control the applied pressure on the nozzle, wherein the electrical signal comprises a first periodic waveform having a first frequency and a second periodic waveform having a second frequency different from the first frequency and a ratio of the second frequency to the first frequency is between approximately 20-150, and wherein the system is configured to generate coalesced droplets from a coalescing of the initial droplets based on the first and second periodic waveforms and drag.

2. The system according to clause 1, further comprising a gas dispenser device configured to dispense the gas in the path of the material.

3. The system according to any of the previous clauses, wherein the first periodic waveform comprises a sinusoidal wave.

4. The system according to any of the previous clauses, wherein the first periodic waveform comprises a frequency between approximately 30-90 kHz.

5. The system according to any of the previous clauses, wherein the first periodic waveform comprises a frequency between approximately 30-70 kHz.

6. The system according to any of the previous clauses, wherein the first periodic waveform comprises a frequency between approximately 70-90 kHz.

7. The system according to any of the previous clauses, wherein the second waveform comprises a square wave.

8. The system according to any of the previous clauses, wherein the second frequency is an integer multiple of the first frequency.

9. The system according to any of the previous clauses, wherein the ratio of the second frequency to the first frequency is between approximately 20-100.

10. The system according to any of the previous clauses, wherein the ratio of the second frequency to the first frequency is between approximately 40-80.

11. The system according to any of the previous clauses, wherein the first and second periodic waveforms are in superposition.

12. The system according to any of the previous clauses, wherein a velocity distribution of the initial droplets are based on perturbations from the applied pressure in response to the first and second periodic waveforms.

13. The system according to any of the previous clauses, wherein each of the coalesced droplets has a similar velocity and gap therebetween.

14. The system according to any of the previous clauses, wherein:

a maximum distance, measured from the nozzle, at which the coalesced droplets form without remnant uncoalesced droplets defines a maximum coalescence length of the system, and the system is configured to adjust the maximum coalescence length by adjusting at least the ratio of the second frequency to the first frequency.

15. The system according to clause 14, wherein the maximum coalescence length is less than approximately 500 mm.

16. The system according to clauses 14 or 15, wherein the maximum coalescence length is less than approximately 450 mm.

17. The system according to any one of clauses 14 to 16, wherein the maximum coalescence length is less than approximately 400 mm.

18. The system according to any one of clauses 14 to 17, wherein the maximum coalescence length is less than approximately 300 mm.

19. The system according to any of the previous clauses, further comprising a controller configured to control a parameter of the first and/or second periodic waveforms.

20. The system according to any of the previous clauses, wherein:

a maximum distance, measured from the nozzle, at which the coalesced droplets form without remnant uncoalesced droplets defines a maximum coalescence length of the system, and the system is configured to adjust the maximum coalescence length by adjusting at least a density or temperature of the gas.

21. The system according to any of the previous clauses, wherein:

a distance, measured from the nozzle, at which the coalesced droplets form without remnant uncoalesced droplets defines a coalescence length of the system, and the system is configured to adjust the coalescence length by adjusting at least a relative phase between the first and second periodic waveforms.

22. The system according to any of the previous clauses, wherein the electromechanical element comprises piezoelectric material.

23. The system according to any of the previous clauses, further comprising a detector configured to detect when each of the coalesced droplets cross a given location in the system and generate a signal.

24. A lithographic apparatus comprising:

an illumination system configured to illuminate a pattern of a patterning device, the illumination system comprising:

a nozzle configured to eject initial droplets of a material through a gas;

an electromechanical element disposed on the nozzle and configured to apply a pressure on the nozzle; and a waveform generator electrically coupled to the electromechanical element and configured to generate an electrical signal to control the applied pressure on the nozzle, wherein the electrical signal comprises a first periodic waveform having a first frequency and a second periodic waveform having a second frequency different from the first frequency and a ratio of the second frequency to the first frequency is between approximately 20-150, and wherein the illumination system is configured to generate coalesced droplets from a coalescing of the initial droplets based on the first and second periodic waveforms and drag.

25. The lithographic apparatus according to clause 24, wherein the illumination system is further configured to generate EUV radiation and the illuminating is performed using the EUV radiation.

26. A method comprising:

ejecting initial droplets of a material using a nozzle;

applying a pressure on the nozzle using an electromechanical element;

dispensing gas in the path of the material;

controlling the applied pressure on the nozzle using an electrical signal, generated by a waveform generator, comprising a first periodic waveform having a first frequency and a second periodic waveform having a second frequency different from the first frequency and a ratio of the second frequency to the first frequency is between approximately 20-150; and coalescing the initial droplets to generate coalesced droplets based on the first and second periodic waveforms and drag.

27. A method comprising:
ejecting initial droplets of a material using a nozzle;
applying a pressure on the nozzle using an electromechanical element;
controlling the applied pressure on the nozzle using an electrical signal generated by a waveform generator, wherein the electrical signal comprises a first periodic waveform and a second periodic waveform;
coalescing the initial droplets to generate coalesced droplets based on the first and second periodic waveforms and drag;
generating a detection signal, using a detector, corresponding to time intervals between crossings of coalesced droplets at the detector; and
determining at least first and second ones of the time intervals using a processor.

28. The method of clause 27, wherein the determining further comprises determining an uncertainty of the time intervals based on the at least first and second ones of the time intervals.

29. The method of clause 28, further comprising determining an occurrence of a jump boundary based on at least the uncertainty of the time intervals using the processor.

30. The method of clause 29, wherein the controlling comprises adjusting a parameter of the electrical signal based on the occurrence of the jump boundary.

31. The method of clause 30, wherein the parameter comprises a relative phase between the first and second periodic waveforms.

32. The method of clause 27, further comprising determining a relationship between the electrical signal and droplet-velocity perturbation at the nozzle based on the at least first and second ones of the time intervals using a processor.

33. The method of clause 32, wherein the determining the relationship between the electrical signal and droplet-velocity perturbation at the nozzle is further based on a distance between the nozzle and the detector.

34. A non-transitory computer readable medium having instructions stored thereon, that, when executed on a processor, cause the processor to perform operations, the operations comprising: receiving a detection signal from a detector of a source material delivery system, wherein the detection signal is associated with time intervals between crossings of coalesced droplets at the detector; and determining at least first and second ones of the time intervals based on the detection signal.

35. The non-transitory computer readable medium of clause 34, wherein the determining further comprises determining an uncertainty of the time intervals based on the at least first and second ones of the time intervals.

36. The non-transitory computer readable medium of clause 35, wherein the operations further comprise determining an occurrence of a jump boundary based on at least the uncertainty of the time intervals using the processor.

37. The non-transitory computer readable medium of clause 36, wherein:
the operations further comprising controlling an applied pressure on a nozzle of the source material delivery system using an electrical signal generated by a waveform generator;
the electrical signal comprises a first periodic waveform and a second periodic waveform; and
the controlling comprises adjusting a parameter of the electrical signal based on the occurrence of the jump boundary.

38. The non-transitory computer readable medium of clause 37, wherein the parameter comprises a relative phase between the first and second periodic waveforms.

39. The non-transitory computer readable medium of clause 34, further comprising determining a relationship between the electrical signal and droplet-velocity perturbation at the nozzle based on the at least first and second ones of the time intervals using a processor.

40. The non-transitory computer readable medium of clause 39, wherein the determining the relationship between the electrical signal and droplet-velocity perturbation at the nozzle is further based on a distance between the nozzle and the detector.

41. A system comprising:
a nozzle configured to eject initial droplets of a material;
an electromechanical element disposed on the nozzle and configured to apply a pressure on the nozzle;
a waveform generator electrically coupled to the electromechanical element, wherein the waveform generator is configured to generate an electrical signal to control the applied pressure on the nozzle,
the electrical signal comprises a first periodic waveform and a second periodic waveform, and
the system is configured to generate coalesced droplets from a coalescing of the initial droplets based on the first and second periodic waveforms;
a detector configured to generate a detection signal comprising information of time intervals between crossings of the coalesced droplets at the detector; and
a processor configured to determine at least first and second ones of the time intervals.

42. The system of clause 41, wherein the determining further comprises determining an uncertainty of the time intervals based on the at least first and second ones of the time intervals.

43. The system of clause 42, wherein the processor is further configured to determine an occurrence of a jump boundary based on at least the uncertainty of the time intervals.

44. The system of clause 43, wherein the processor is further configured to adjust a parameter of the electrical signal based on the occurrence of the jump boundary.

45. The system of clause 44, wherein the parameter comprises a relative phase between the first and second periodic waveforms.

46. The system of clause 41, wherein the processor is further configured to determine a relationship between the electrical signal and droplet-velocity perturbation at the nozzle based on the at least first and second ones of the time intervals using a processor.

While specific embodiments of the present disclosure have been described above, it will be appreciated that the present disclosure can be practiced otherwise than as described. The description is not intended to limit the present disclosure.

It is to be appreciated that the Detailed Description section, and not the Summary and Abstract sections, is intended to be used to interpret the claims. The Summary and Abstract sections may set forth one or more but not all exemplary embodiments of the present disclosure as contemplated by the inventor(s), and thus, are not intended to limit the present disclosure and the appended claims in any way.

The present disclosure has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein.

The breadth and scope of protected subject matter should not be limited by any of the above-described exemplary embodiments, but should be defined only in accordance with the following claims and their equivalents.

The invention claimed is:

1. A method comprising:

ejecting initial droplets of a material using a nozzle of a source material delivery system;

applying a pressure on the nozzle using an electromechanical element;

controlling the applied pressure on the nozzle using an electrical signal generated by a waveform generator and supplied to the electromechanical element, wherein the electrical signal comprises a first periodic waveform and a second periodic waveform;

coalescing the initial droplets to generate coalesced droplets;

generating, using a detector, a detection signal, corresponding to time intervals between crossings of coalesced droplets at the detector;

using a processor in conjunction with the detector, measuring and tracking over time a variability of the time intervals;

determining, using the processor, that a discontinuity behavior in a coalescence length of the droplets occurs by determining whether a current variability of the time intervals (1) exceeds a predetermined variability, or (2) exceeds a previous variability of the time intervals by a predetermined value;

using the processor, storing, upon determining that the discontinuity behavior is occurring, information representing that a discontinuity is occurring or has occurred at a then-current relative phase between the first periodic waveform and the second periodic waveform and/or at a then-current amplitude or inverse amplitude of the first periodic waveform;

changing the electrical signal supplied to the electromechanical element by adjusting (1) the relative phase between the first periodic waveform and the second periodic waveform and/or (2) the amplitude or the inverse amplitude of the first periodic waveform; and repeating the above acts.

2. The method of claim 1, wherein measuring the variability of the time interval comprises determining a statistical distribution over time of the time intervals.

3. The method of claim 2, wherein determining whether a discontinuity behavior in a coalescence length of the droplets occurs comprises detecting at least a sudden rise in an uncertainty of the time intervals in the statistical distribution.

4. The method of claim 3, further comprising adjusting the first and second periodic waveforms while detecting the discontinuity behavior and determining a quantitative relationship of how the source material delivery system transfers the electrical signal to droplet-velocity perturbations at the nozzle based on shifts in the discontinuity behavior in the coalescence length of the droplets.

5. The method of claim 4, wherein the determining the relationship between the electrical signal and droplet-velocity perturbation at the nozzle is further based on a distance between the nozzle and the detector.

6. A non-transitory computer readable medium having instructions stored thereon, that, when executed on a processor, cause the processor to perform operations, the operations comprising:

receiving a detection signal from a detector of a source material delivery system, wherein the detection signal is associated with time intervals between crossings of coalesced droplets at the detector;

measuring and tracking over time a variability of the time intervals;

determining whether a discontinuity behavior in a coalescence length of the droplets occurs based on determining whether a current variability of the time intervals (1) exceeds a predetermined variability, or (2) exceeds a previous variability of the time intervals by a predetermined value;

adjusting a parameter of an electrical signal supplied to an electromechanical element disposed on a nozzle of the source material delivery system based on the occurrence of the discontinuity behavior in the coalescence length of the droplets to thereby control an applied pressure to the nozzle; and mapping the discontinuity behavior as a function of (1) a relative phase between a first periodic waveform of the electrical signal and a second periodic waveform of the electrical signal and/or (2) an amplitude or an inverse amplitude of the first periodic waveform of the electrical signal by storing, upon determining that the discontinuity behavior is occurring, information representing that a discontinuity is occurring or has occurred at the then-current relative phase and/or the amplitude or inverse amplitude.

7. The non-transitory computer readable medium of claim 6, wherein determining whether a discontinuity behavior in a coalescence length of the droplets occurs comprises determining a statistical distribution over time of the time intervals, and the operations further comprise determining that there is discontinuity behavior in the coalescence length of the droplets based on at least a sudden rise in a variability in the statistical distribution.

8. The non-transitory computer readable medium of claim 7, wherein:

the electrical signal comprises a first periodic waveform and a second periodic waveform.

9. The non-transitory computer readable medium of claim 8, wherein the parameter comprises a relative phase between the first and second periodic waveforms.

10. The method of claim 6, wherein the parameter comprises a relative phase between the first and second periodic waveforms.

11. The non-transitory computer readable medium of claim 7, further comprising determining a quantitative relationship of how the source material delivery system transfers the electrical signal to droplet-velocity perturbations at the nozzle based on shifts in the discontinuity behavior in the coalescence length of the droplets.

12. The non-transitory computer readable medium of claim 11, wherein the determining the quantitative relationship is further based on a distance between the nozzle and the detector.

13. A source material delivery system comprising:

a nozzle configured to eject initial droplets of a material;

an electromechanical element disposed on the nozzle and configured to apply a pressure on the nozzle;

a waveform generator electrically coupled to the electromechanical element, wherein the waveform generator is configured to generate an electrical signal supplied to the electromechanical element to control the applied pressure on the nozzle, the electrical signal comprises a first periodic waveform and a second periodic waveform, and the system is configured to generate coalesced droplets from a coalescing of the initial droplets based on the first and second periodic waveforms;

a detector configured to generate a detection signal comprising information of time intervals between crossings of the coalesced droplets at the detector; and a processor configured to measure and track a variability of the time intervals over time, to determine whether a discontinuity behavior in a coalescence length of the droplets occurs by determining whether a current variability of the time intervals (1) exceeds a predetermined variability, or (2) exceeds a previous variability of the time intervals by a predetermined value, and to map the discontinuity behavior as a function of (1) a relative phase between the first periodic waveform and the second periodic waveform and/or (2) an amplitude or an inverse amplitude of the first periodic waveform by storing in a memory or memory device associated with the processor information representing that a discontinuity is occurring or has occurred at the then-current relative phase and/or the amplitude or inverse amplitude upon determining that the discontinuity behavior is occurring.

14. The system of claim 13, wherein the determining whether a current variability of the time intervals (1) exceeds a predetermined variability, or (2) exceeds a previous variability of the time intervals by a predetermined value, comprises determining a statistical distribution over time of the time intervals.

15. The system of claim 14, wherein the processor is configured to determine that there is a discontinuity behavior in the coalescence length of the droplets based on at least a sudden rise the variability of the time intervals in the statistical distribution.

16. The system of claim 15, wherein the processor is further configured to adjust a parameter of the electrical signal based on the occurrence of the discontinuity behavior in the coalescence length of the droplets.

17. The system of claim 16, wherein the parameter comprises a relative phase between the first and second periodic waveforms.

18. The system of claim 14, wherein the processor is further configured to determine a quantitative relationship of how the source material delivery system transfers the electrical signal to droplet-velocity perturbations at the nozzle based on shifts in the discontinuity behavior in the coalescence length of the droplets.

* * * * *